US012684579B2

(12) United States Patent
Rico Alvarino et al.

(10) Patent No.: US 12,684,579 B2
(45) Date of Patent: Jul. 14, 2026

(54) MULTIPLE BANDWIDTH OPERATION

(71) Applicant: QUALCOMM Incorporated, San Diego, CA (US)

(72) Inventors: Alberto Rico Alvarino, San Diego, CA (US); Wanshi Chen, San Diego, CA (US); Peter Gaal, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/660,887

(22) Filed: Jul. 26, 2017

(65) Prior Publication Data

US 2018/0077689 A1 Mar. 15, 2018

Related U.S. Application Data

(60) Provisional application No. 62/395,246, filed on Sep. 15, 2016.

(51) Int. Cl.
*H04W 72/23* (2023.01)
*H04L 5/00* (2006.01)
(Continued)

(52) U.S. Cl.
CPC ........... *H04W 72/23* (2023.01); *H04L 5/0042* (2013.01); *H04L 5/0094* (2013.01);
(Continued)

(58) Field of Classification Search
CPC ............. H04W 72/042; H04W 72/048; H04W 72/0453
(Continued)

(56) References Cited

U.S. PATENT DOCUMENTS 4,402,480 A * 9/1983 Udell ................... B64G 1/1021
244/158.1
8,565,689 B1 10/2013 Rubin et al.
(Continued)

FOREIGN PATENT DOCUMENTS

CN 102625456 A 8/2012
CN 102754374 A * 10/2012 ......... H04L 27/2613
(Continued)

OTHER PUBLICATIONS

ISA/EP, International Search Report and Written Opinion of the International Searching Authority, Int'l Application No. PCT/US2017/044086, Oct. 26, 2017, European Patent Office, Rijswijk, NL, 12 pgs.

(Continued)

*Primary Examiner* — Charles T Shedrick
(74) *Attorney, Agent, or Firm* — Holland & Hart LLP/Qualcomm

(57) ABSTRACT

Methods, apparatus, systems, and devices for wireless communication are described. In one method, a wireless device receives a broadcast of a first message including an indication of a first bandwidth value; receives, based on the first bandwidth value, a second message including an indication of a second bandwidth value; and receives downlink transmissions based on the second bandwidth value following receipt of the second message. The second bandwidth value supplements the first bandwidth value. In another method, a wireless device identifies a narrowband bandwidth value; receives, based on the narrowband bandwidth value, a message including an indication of a wideband bandwidth value; modifies the narrowband bandwidth value based on the wideband bandwidth value; and receives downlink transmissions based on the modified narrowband bandwidth value following receipt of the message. The wideband
(Continued)

bandwidth value is greater than the narrowband bandwidth value.

37 Claims, 15 Drawing Sheets

(51) Int. Cl.
    *H04L 47/76*       (2022.01)
    *H04W 72/0453*   (2023.01)
    *H04W 72/51*     (2023.01)

(52) U.S. Cl.
    CPC ......... *H04W 72/0453* (2013.01); *H04L 47/76* (2013.01); *H04W 72/51* (2023.01)

(58) Field of Classification Search
    USPC ......................................................... 370/329
    See application file for complete search history.

(56) References Cited

U.S. PATENT DOCUMENTS

| | | | | |
|---|---|---|---|---|
| 9,967,778 | B2 * | 5/2018 | You | H04W 74/002 |
| 2006/0126558 | A1 * | 6/2006 | Lee | H04W 36/14 |
| | | | | 370/341 |
| 2008/0069060 | A1 * | 3/2008 | Das | H04W 72/23 |
| | | | | 370/347 |
| 2009/0010219 | A1 * | 1/2009 | Lee | H04B 17/24 |
| | | | | 370/329 |
| 2009/0181687 | A1 * | 7/2009 | Tiirola | H04L 5/0048 |
| | | | | 455/507 |
| 2010/0222007 | A1 * | 9/2010 | Rao | H04W 24/10 |
| | | | | 455/67.11 |
| 2010/0331030 | A1 * | 12/2010 | Nory | H04W 72/23 |
| | | | | 455/63.1 |
| 2011/0090809 | A1 * | 4/2011 | Chen | H04L 5/0091 |
| | | | | 370/252 |
| 2011/0130092 | A1 * | 6/2011 | Yun | H04W 72/541 |
| | | | | 455/39 |
| 2011/0274074 | A1 | 11/2011 | Lee et al. | |
| 2012/0000003 | A1 | 1/2012 | Matthews | |
| 2012/0003941 | A1 * | 1/2012 | Xiao | H04W 52/0229 |
| | | | | 455/68 |
| 2012/0039268 | A1 * | 2/2012 | Hakkinen | H04L 5/001 |
| | | | | 370/329 |
| 2013/0010715 | A1 | 1/2013 | Dinan et al. | |
| 2013/0034066 | A1 * | 2/2013 | Kakishima | H04L 27/2613 |
| | | | | 370/329 |
| 2013/0083753 | A1 * | 4/2013 | Lee | H04W 74/0833 |
| | | | | 370/329 |
| 2013/0195072 | A1 * | 8/2013 | Zhu | H04L 5/0094 |
| | | | | 370/330 |
| 2013/0259010 | A1 | 10/2013 | Jechoux et al. | |
| 2014/0328303 | A1 * | 11/2014 | Jamadagni | H04L 5/0044 |
| | | | | 370/329 |
| 2015/0085776 | A1 * | 3/2015 | Morioka | H04L 5/003 |
| | | | | 370/329 |
| 2015/0161070 | A1 | 6/2015 | Duroiu et al. | |
| 2015/0365209 | A1 | 12/2015 | Yi et al. | |
| 2016/0063359 | A1 * | 3/2016 | Szegedy | G06N 3/084 |
| | | | | 382/158 |
| 2016/0081089 | A1 * | 3/2016 | Suzuki | H04W 72/0453 |
| | | | | 370/343 |
| 2016/0100408 | A1 * | 4/2016 | Hedayat | H04L 5/0037 |
| | | | | 370/329 |
| 2016/0269244 | A1 | 9/2016 | Nalluri et al. | |
| 2016/0378863 | A1 * | 12/2016 | Shlens | G06N 3/08 |
| | | | | 707/769 |
| 2017/0063716 | A1 | 3/2017 | Marjou et al. | |
| 2017/0070994 | A1 * | 3/2017 | Rico Alvarino | H04L 5/0007 |
| 2017/0094585 | A1 | 3/2017 | Byun et al. | |
| 2017/0230985 | A1 * | 8/2017 | Yamada | H04W 72/23 |
| 2018/0054801 | A1 * | 2/2018 | Vos | H04W 48/12 |
| 2018/0054821 | A1 * | 2/2018 | Sun | H04W 72/0453 |
| 2018/0075343 | A1 * | 3/2018 | van den Oord | G06N 3/084 |
| 2018/0077708 | A1 * | 3/2018 | Lepp | H04W 72/23 |
| 2018/0097607 | A1 * | 4/2018 | Ji | H04W 72/23 |
| 2018/0248668 | A1 * | 8/2018 | Hwang | H04L 5/0094 |
| 2018/0270008 | A1 * | 9/2018 | Yi | H04W 4/80 |
| 2018/0329897 | A1 * | 11/2018 | Kalchbrenner | G06N 3/047 |
| 2019/0044683 | A1 * | 2/2019 | Wu | H04B 7/0452 |
| 2019/0223183 | A1 * | 7/2019 | Urabayashi | H04W 72/0453 |
| 2019/0260530 | A1 * | 8/2019 | Yi | H04L 5/001 |
| 2020/0073968 | A1 * | 3/2020 | Zhang | G06F 16/137 |
| 2020/0302236 | A1 * | 9/2020 | Gao | G06F 18/2415 |
| 2020/0364508 | A1 * | 11/2020 | Gurel | G06V 20/41 |
| 2020/0367213 | A1 | 11/2020 | Ryu et al. | |
| 2021/0279929 | A1 * | 9/2021 | Murray | G06T 7/10 |
| 2021/0295053 | A1 * | 9/2021 | Ohashi | G06V 40/20 |

FOREIGN PATENT DOCUMENTS

| | | | | |
|---|---|---|---|---|
| CN | 102916785 | A * | 2/2013 | H04L 1/0031 |
| CN | 101352078 | B | 4/2014 | |
| CN | 103999528 | A | 8/2014 | |
| CN | 105357773 | A | 2/2016 | |
| CN | 108512642 | A * | 9/2018 | H04B 7/0452 |
| EP | 1670277 | A1 | 6/2006 | |
| FR | 3084946 | A1 * | 2/2020 | G06N 3/0445 |
| JP | 2013021416 | A * | 1/2013 | |
| JP | 2014207598 | A | 10/2014 | |
| WO | WO-2014069945 | A1 * | 5/2014 | H04L 1/08 |
| WO | WO-2016159681 | A1 * | 10/2016 | H04B 7/26 |
| WO | WO-2017039373 | A1 * | 3/2017 | H04J 11/0069 |
| WO | WO-2019216910 | A1 * | 11/2019 | |

OTHER PUBLICATIONS

Motorola, "Improving UL Data Frequency Hopping Performance with Sounding and Frequency Semi-Selective Scheduling", 3GPP TSG RAN WG1 Meeting #49bis, R1-072685 Orlando, USA, Jun. 25-29, 2007, 4 Pages.

NTT Docomo, Inc: "Views on Processing Time Reduction and Related Procedures", 3GPP TSG RAN WG1 Meeting #86, R1-16737, Gothenburg, Sweden, Aug. 22-26, 2016, pp. 1-6.

Taiwan Search Report—TW106125467—TIPO—Mar. 15, 2021 (165330TW).

Interdigital Communications: "Forward Compatible Control Channel Framework for NR," 3GPP Draft, R1-167327, 3rd Generation Partnership Project (3GPP), Mobile Competence Centre, 650, Route Des Lucioles, F-06921 Sophia-Antipolis Cedex, France vol. RAN WG1, No. Göteborg, Aug. 22, 2016-Aug. 26, 2016 Aug. 21, 2016 (Aug. 21, 2016), XP051125846, pp. 1-5, Retrieved from the Internet: URL:http://www.3gpp.org/ftp/Meetings_3GPP_SYNC/RAN1/Docs/ [retrieved on Aug. 21, 2016].

<Span style="font-family: calibri;">Huawei: "Forward Compatibility Consideration on Reference Signals and Control Information/Channels", R1-164046, 3GPP TSG RAN WG1 Meeting #85, 7.1.1, Nanjing, China, May 23-27, 2016, pp. 1-3.

<Span style="font-family: calibri;">Huawei: "Support of Flexible Bandwidth", R1-166106, 3GPP TSG RAN WG1 Meeting #86, 8.1.3.2, Gothenburg, Sweden, Aug. 22-26, 2016, pp. 1-6.

\* cited by examiner

200

115-a

UE

Base
Station 105-a

205

210  Identify first
bandwidth value

◄────────First Message────────

215  Monitor for /
receive downlink
transmissions
based on first
bandwidth value ◄── ──Downlink Transmissions── ── ──

220

◄────────Second Message────────

225

◄── ── ──Additional Message(s)── ── ──

230  Receive/decode/
process/apply
bandwidth values
and/or frequency
offsets

235

240  Monitor for /
receive downlink
transmissions
based on at least
the second
bandwidth value ◄────Downlink Transmissions────

FIG. 2

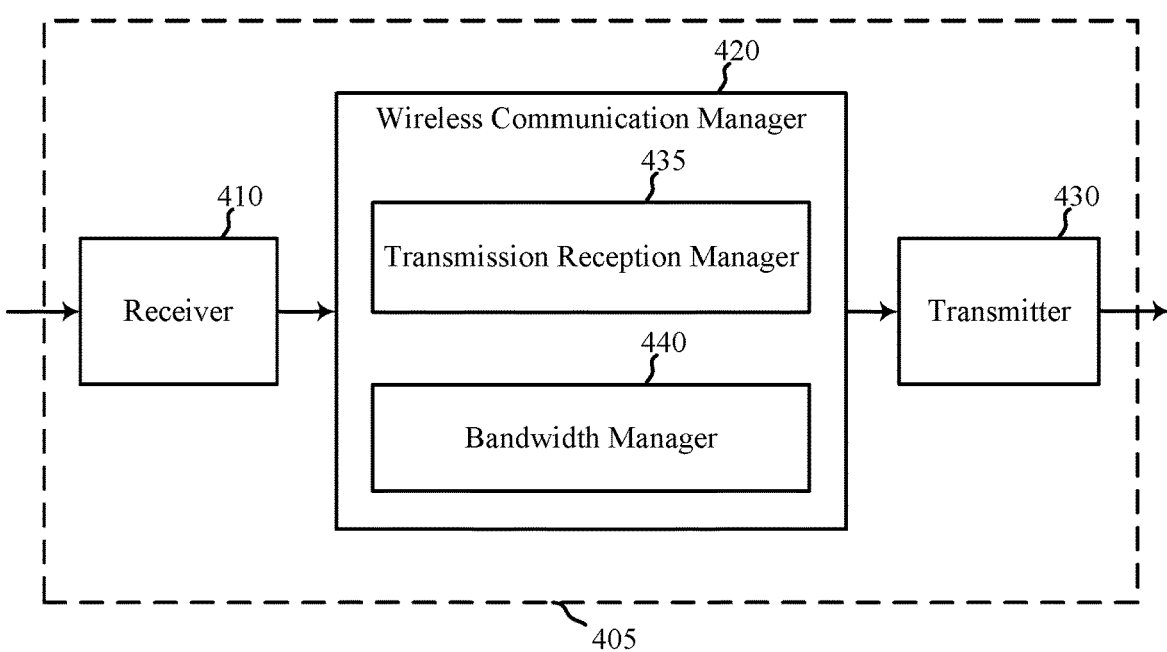
FIG. 4

500

520

Wireless Communication Manager 435-a

Transmission Reception Manager

535

DCI Interpreter

540

Blind Decoding Manager 440-a

Bandwidth Manager

545

Bandwidth Value Deriver

550

Bandwidth Offset Manager

600

700
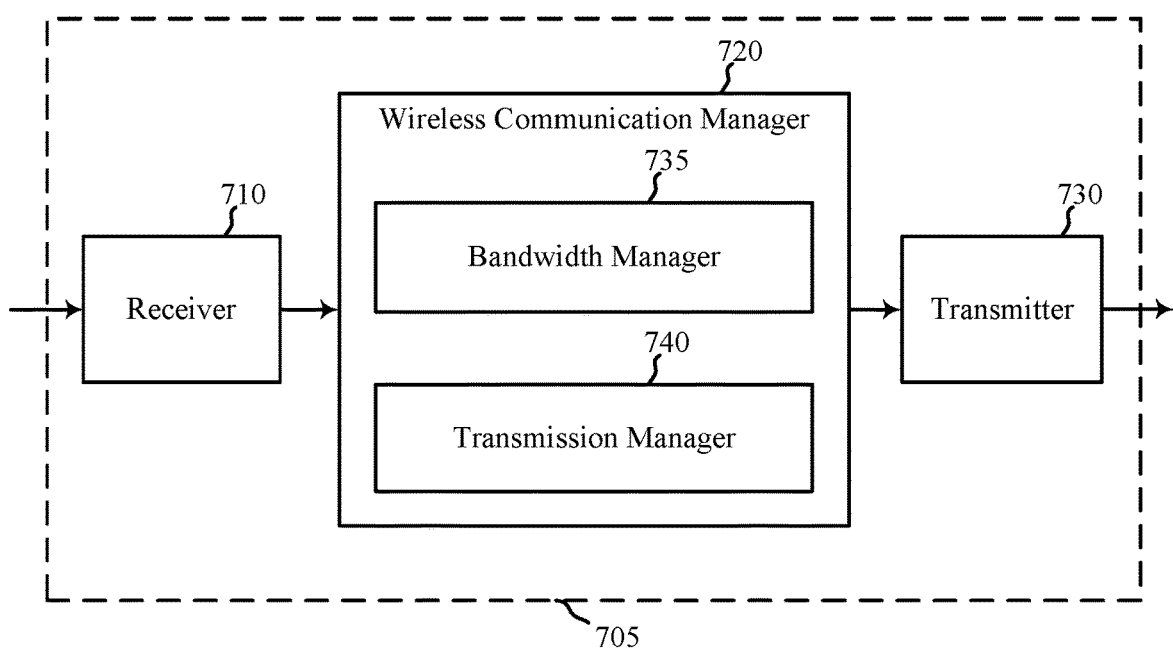
720
Wireless Communication Manager
735
710
Bandwidth Manager
Receiver
730
740
Transmitter
Transmission Manager
705
FIG. 7

1000

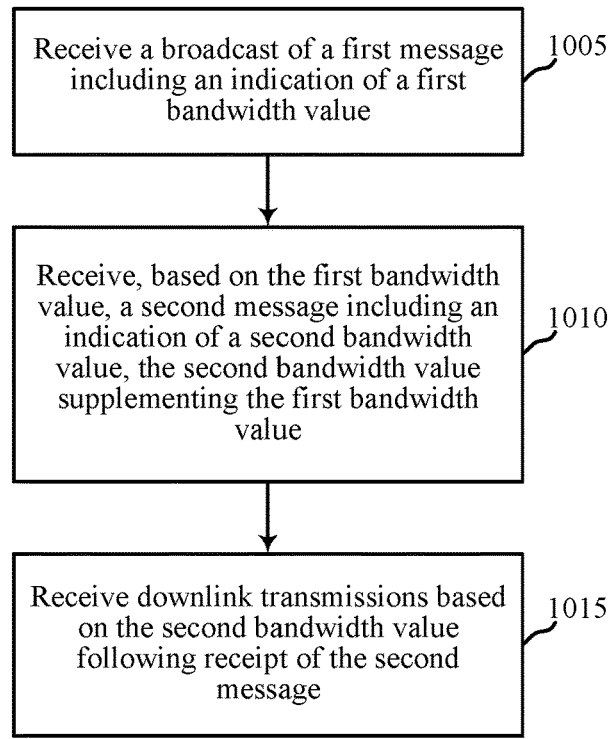

Receive a broadcast of a first message including an indication of a first bandwidth value　1005

Receive, based on the first bandwidth value, a second message including an indication of a second bandwidth value, the second bandwidth value supplementing the first bandwidth value　1010

Receive downlink transmissions based on the second bandwidth value following receipt of the second message　1015

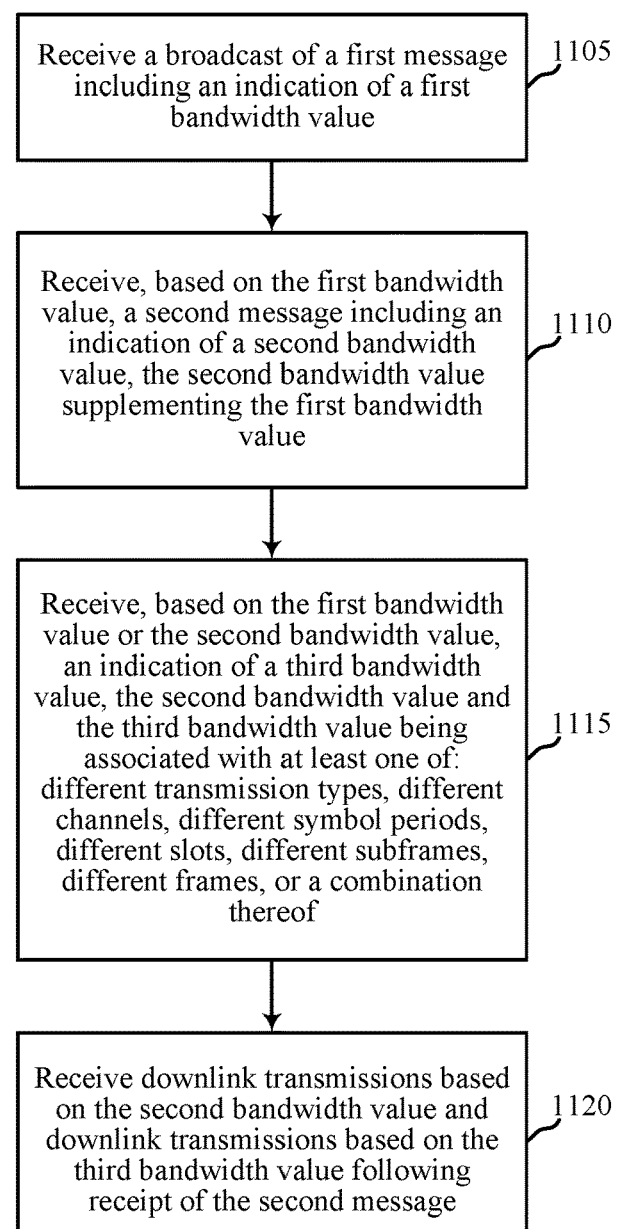

Receive a broadcast of a first message including an indication of a first bandwidth value   1105

Receive, based on the first bandwidth value, a second message including an indication of a second bandwidth value, the second bandwidth value supplementing the first bandwidth value   1110

Receive, based on the first bandwidth value or the second bandwidth value, an indication of a third bandwidth value, the second bandwidth value and the third bandwidth value being associated with at least one of: different transmission types, different channels, different symbol periods, different slots, different subframes, different frames, or a combination thereof   1115

Receive downlink transmissions based on the second bandwidth value and downlink transmissions based on the third bandwidth value following receipt of the second message   1120

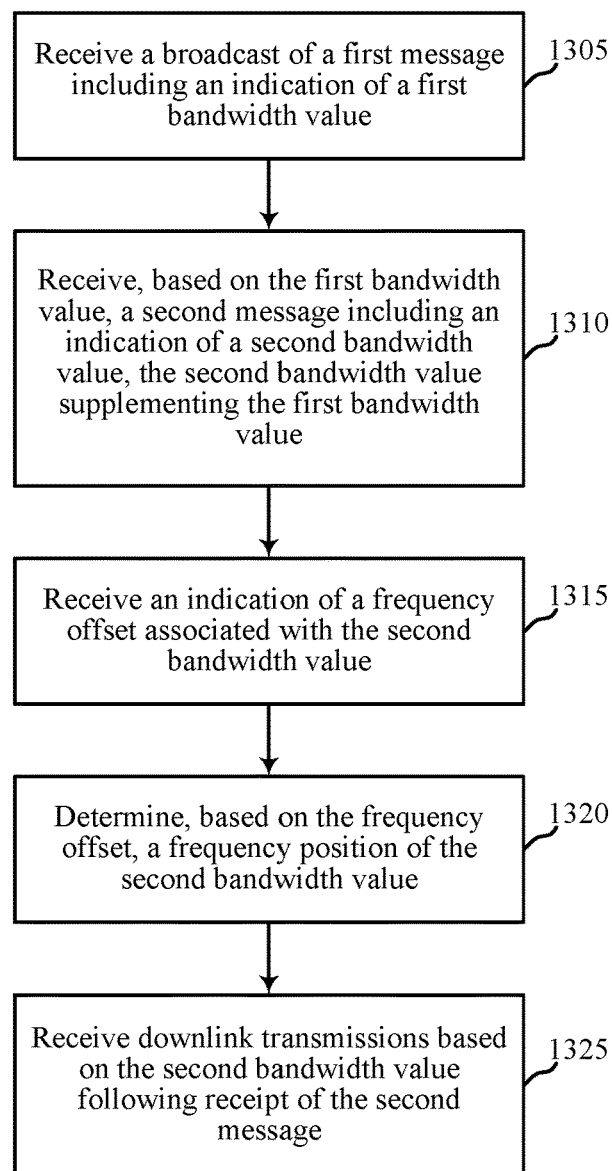

Receive a broadcast of a first message including an indication of a first bandwidth value    1305

Receive, based on the first bandwidth value, a second message including an indication of a second bandwidth value, the second bandwidth value supplementing the first bandwidth value    1310

Receive an indication of a frequency offset associated with the second bandwidth value    1315

Determine, based on the frequency offset, a frequency position of the second bandwidth value    1320

Receive downlink transmissions based on the second bandwidth value following receipt of the second message    1325

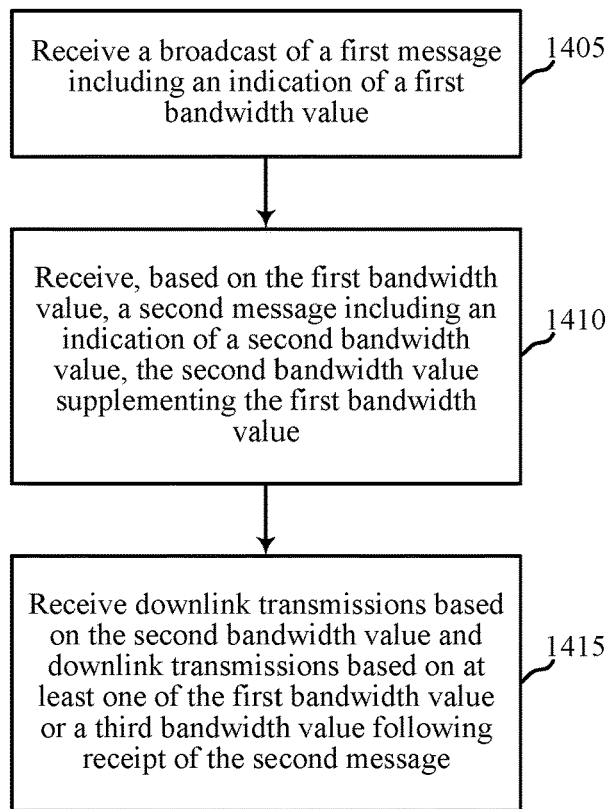

Receive a broadcast of a first message including an indication of a first bandwidth value    1405

Receive, based on the first bandwidth value, a second message including an indication of a second bandwidth value, the second bandwidth value supplementing the first bandwidth value    1410

Receive downlink transmissions based on the second bandwidth value and downlink transmissions based on at least one of the first bandwidth value or a third bandwidth value following receipt of the second message    1415

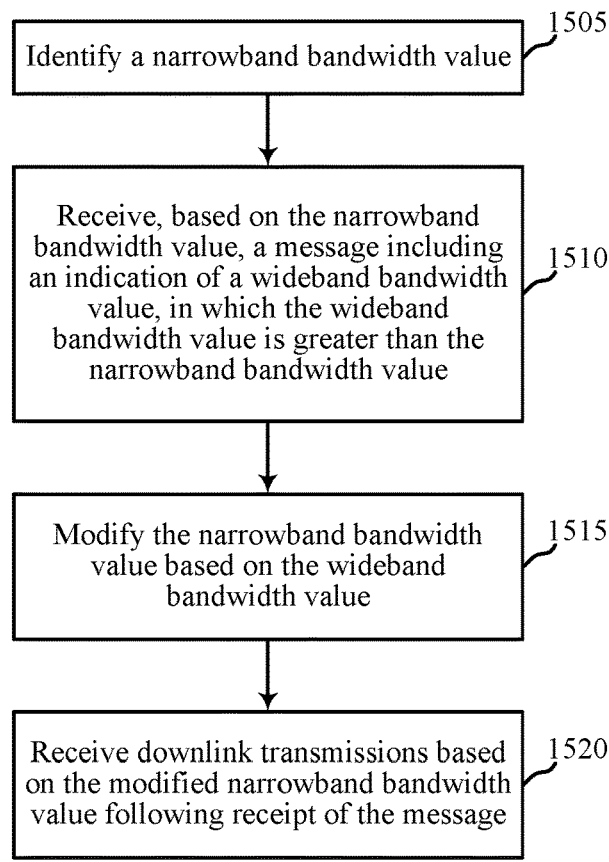

Identify a narrowband bandwidth value 1505

Receive, based on the narrowband bandwidth value, a message including an indication of a wideband bandwidth value, in which the wideband bandwidth value is greater than the narrowband bandwidth value 1510

Modify the narrowband bandwidth value based on the wideband bandwidth value 1515

Receive downlink transmissions based on the modified narrowband bandwidth value following receipt of the message 1520

FIG. 15

MULTIPLE BANDWIDTH OPERATION

CROSS REFERENCES

The present Application for Patent claims priority to U.S. Provisional Patent Application No. 62/395,246 by Rico Alvarino, et al., entitled "Multiple Bandwidth Operation," filed Sep. 15, 2016, assigned to the assignee hereof.

BACKGROUND

Field of the Disclosure

The present disclosure, for example, relates to wireless communication systems, and more particularly to wireless communication systems capable of transmitting/receiving over multiple bandwidths.

Description of Related Art

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communication system may include a number of base stations, each simultaneously supporting communication for multiple communication devices, which may each be referred to as user equipment (UE).

In Long Term Evolution (LTE) and LTE-Advanced (LTE-A) communication systems, a base station signals a bandwidth value to UEs in a physical broadcast channel (PBCH), and the bandwidth value defines the bandwidth used for all physical channels/signals having a fixed bandwidth allocation (e.g., physical downlink control channel (PDCCH), cell-specific reference signal (CRS), etc.). For radio resource management (RRM), a UE may assume a fixed bandwidth allocation (e.g., 1.4 MHz or a center 6 physical resource blocks (PRBs)).

SUMMARY

Wireless devices that use a fixed bandwidth allocation have a low degree of flexibility and may not be forward compatible with wireless communication systems based on new wireless standards. For example, new wireless communication systems or standards may be based on communication according to new bandwidth values, or based on new signals, which new signals are based on new bandwidth values. Methods, apparatus, systems, and devices disclosed in the present disclosure provide for multiple bandwidth operation of wireless devices. A wireless device may receive transmissions based on a first bandwidth value. The transmissions may include a transmission that indicates a second bandwidth value. The second bandwidth value may supplement the first bandwidth value and enable the wireless device to receive additional transmissions based on the second bandwidth value. In some other cases, the second bandwidth value may replace the first bandwidth value, allowing the wireless device to receive transmissions based on the second bandwidth value.

In one example, a method for wireless communication at a wireless device is described. The method may include receiving a broadcast of a first message including an indication of a first bandwidth value; receiving, based on the first bandwidth value, a second message including an indication of a second bandwidth value; and receiving downlink transmissions based on the second bandwidth value following receipt of the second message. The second bandwidth value may supplement the first bandwidth value.

In one example, an apparatus for wireless communication at a wireless device is described. The apparatus may include means for receiving a broadcast of a first message including an indication of a first bandwidth value; means for receiving, based on the first bandwidth value, a second message including an indication of a second bandwidth value; and means for receiving downlink transmissions based on the second bandwidth value following receipt of the second message. The second bandwidth value may supplement the first bandwidth value.

In one example, another apparatus for wireless communication at a wireless device is described. The apparatus may include a processor, memory in electronic communication with the processor, and instructions stored in the memory. The instructions may be operable, when executed by the processor, to cause the apparatus to receive a broadcast of a first message including an indication of a first bandwidth value; receive, based on the first bandwidth value, a second message including an indication of a second bandwidth value; and receive downlink transmissions based on the second bandwidth value following receipt of the second message. The second bandwidth value may supplement the first bandwidth value.

In one example, a non-transitory computer-readable medium storing computer-executable code for wireless communication at a wireless device is described. The code may be executable to receive a broadcast of a first message including an indication of a first bandwidth value; receive, based on the first bandwidth value, a second message including an indication of a second bandwidth value; and receive downlink transmissions based on the second bandwidth value following receipt of the second message. The second bandwidth value may supplement the first bandwidth value.

In some examples of the method, apparatus, and computer-readable medium described above, the second bandwidth value may replace the first bandwidth value for at least one of a transmission type, a channel, a symbol period, a slot, a subframe, a frame, or a combination thereof. In some examples of the method, apparatus, and computer-readable medium described above, the second bandwidth may be associated with a device type of the wireless device. In some examples of the method, apparatus, and computer-readable medium described above, the second message may include at least one of: a system information message, a broadcast message, a unicast message, or a resource grant.

Some examples of the method, apparatus, and computer-readable medium described above may further include processes, features, means, instructions, or code for receiving, based on the first bandwidth value or the second bandwidth value, an indication of a third bandwidth value, where the second bandwidth value and the third bandwidth value are associated with at least one of different transmission types, different channels, different symbol periods, different slots, different subframes, different frames, or a combination thereof; and receiving downlink transmissions based on the third bandwidth value following receipt of the second message.

Some examples of the method, apparatus, and computer-readable medium described above may further include processes, features, means, instructions, or code for receiving the indication of the third bandwidth value in the second message or in a third message.

Some examples of the method, apparatus, and computer-readable medium described above may further include processes, features, means, instructions, or code for receiving the first message in a physical broadcast channel (PBCH).

In some examples of the method, apparatus, and computer-readable medium described above, the second bandwidth value may be associated with receipt of at least one reference signal (RS), control channel, data channel, or combination thereof.

In some examples of the method, apparatus, and computer-readable medium described above, the second bandwidth value may be associated with receipt of a data channel. In these examples, the method, apparatus, and computer-readable medium may further include processes, features, means, instructions, or code for deriving a third bandwidth value based on at least one of the second bandwidth value, a data channel grant, or a combination thereof, the third bandwidth value associated with receipt of a RS for demodulation of the data channel.

In some examples of the method, apparatus, and computer-readable medium described above, the second bandwidth value may be associated with receipt of a data channel. In these examples, the method, apparatus, and computer-readable medium may further include processes, features, means, instructions, or code for receiving downlink control information (DCI) following receipt of the second message, and interpreting the DCI based on the second bandwidth value.

In some examples of the method, apparatus, and computer-readable medium described above, the second bandwidth value may be associated with receipt of a control channel. In these examples, the method, apparatus, and computer-readable medium may further include processes, features, means, instructions, or code for determining, based on the second bandwidth value, at least one of a third bandwidth value associated with receipt of a RS for demodulation of the control channel, a set of physical downlink control channel (PDCCH) resources to be monitored, or a combination thereof.

In some examples of the method, apparatus, and computer-readable medium described above, the second bandwidth value may be associated with receipt of a control channel. In these examples, the method, apparatus, and computer-readable medium may further include processes, features, means, instructions, or code for identifying a candidate message for blind decoding based on the second bandwidth value.

Some examples of the method, apparatus, and computer-readable medium described above may further include processes, features, means, instructions, or code for receiving an indication of a frequency offset associated with the second bandwidth value; and determining, based on the frequency offset, a frequency position of the second bandwidth value. In these examples, the method, apparatus, and computer-readable medium may further include processes, features, means, instructions, or code for receiving the indication of the frequency offset in the second message or in a third message.

Some examples of the method, apparatus, and computer-readable medium described above may further include processes, features, means, instructions, or code for receiving downlink transmissions based on at least one of the first bandwidth value or a third bandwidth value following receipt of the second message. In these examples, the received downlink transmissions may include a channel, and a reference signal for the channel, received based on different bandwidth values, different frequency positions, or a combination thereof.

Some examples of the method, apparatus, and computer-readable medium described above may further include processes, features, means, instructions, or code for implicitly deriving the indication of the second bandwidth value from the second message.

In one example, another method for wireless communication at a wireless device is described. The method may include identifying a narrowband bandwidth value; receiving, based on the narrowband bandwidth value, a message including an indication of a wideband bandwidth value; modifying the narrowband bandwidth value based on the wideband bandwidth value; and receiving downlink transmissions based on the modified narrowband bandwidth value following receipt of the message. The wideband bandwidth value may be greater than the narrowband bandwidth value.

In one example, another apparatus for wireless communication at a wireless device is described. The apparatus may include means for identifying a narrowband bandwidth value; means for receiving, based on the narrowband bandwidth value, a message including an indication of a wideband bandwidth value; means for modifying the narrowband bandwidth value based on the wideband bandwidth value; and means for receiving downlink transmissions based on the modified narrowband bandwidth value following receipt of the message. The wideband bandwidth value may be greater than the narrowband bandwidth value.

In one example, another apparatus for wireless communication at a wireless device is described. The apparatus may include a processor, memory in electronic communication with the processor, and instructions stored in the memory. The instructions may be operable, when executed by the processor, to cause the apparatus to identify a narrowband bandwidth value; receive, based on the narrowband bandwidth value, a message including an indication of a wideband bandwidth value; modify the narrowband bandwidth value based on the wideband bandwidth value; and receive downlink transmissions based on the modified narrowband bandwidth value following receipt of the message. The wideband bandwidth value may be greater than the narrowband bandwidth value.

In one example, another non-transitory computer-readable medium storing computer-executable code for wireless communication at a wireless device is described. The code may be executable to identify a narrowband bandwidth value; receive, based on the narrowband bandwidth value, a message including an indication of a wideband bandwidth value; modify the narrowband bandwidth value based on the wideband bandwidth value; and receive downlink transmissions based on the modified narrowband bandwidth value following receipt of the message. The wideband bandwidth value may be greater than the narrowband bandwidth value.

In some examples of the method, apparatus, and computer-readable medium described above, modifying the narrowband bandwidth value may include increasing the narrowband bandwidth value for at least one of: receipt of a RS, time tracking, frequency tracking, signal measurement, or a combination thereof.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

FIG. 2 shows an example message flow between a base station and a UE, in accordance with various aspects of the present disclosure;

FIG. 4 shows a block diagram of a wireless device that supports operation in multiple bandwidths, in accordance with various aspects of the present disclosure;

FIG. 7 shows a block diagram of a wireless device that supports operation in multiple bandwidths, in accordance with various aspects of the present disclosure;

FIG. 10 shows a flowchart illustrating a method for wireless communication in multiple bandwidths, in accordance with various aspects of the present disclosure;

FIG. 11 shows a flowchart illustrating a method for wireless communication in multiple bandwidths, in accordance with various aspects of the present disclosure;

FIG. 13 shows a flowchart illustrating a method for wireless communication in multiple bandwidths, in accordance with various aspects of the present disclosure;

FIG. 14 shows a flowchart illustrating a method for wireless communication in multiple bandwidths, in accordance with various aspects of the present disclosure; and FIG. 15 shows a flowchart illustrating a method for wireless communication in multiple bandwidths, in accordance with various aspects of the present disclosure.

DETAILED DESCRIPTION

The disclosed examples illustrate techniques that enable a wireless device (e.g., a UE) to operate according to multiple bandwidths, which bandwidths may be indicated to the wireless device by a network access device (e.g., a base station). For example, a base station may broadcast a first bandwidth value in a PBCH, and a UE may use the first bandwidth value to receive transmissions from the base station. A second bandwidth value may be indicated in one of the transmissions, and may be used by the UE to supplement the first bandwidth value, replace the first bandwidth value, or override the first bandwidth value for at least one or more channels with a fixed bandwidth allocation. In some cases, the second bandwidth value may be associated with one or more of a device type, a transmission type, a channel, a symbol period, a slot, a subframe, a frame, or a combination thereof. In some cases, the base station may transmit, to the UE, multiple bandwidth values that the UE may use to supplement or replace the first bandwidth value. In some cases, the multiple bandwidth values may be associated with one or more of: a reference signal (RS) bandwidth, control channel bandwidth, data channel bandwidth, or a combination thereof. Furthermore, in some cases, the RS bandwidth may be determined based on the data channel bandwidth, which may in turn provide the UE an indication of interpreting downlink control information (DCI) based on the second bandwidth value. In some cases, the second bandwidth value may be associated with a control channel bandwidth. In such cases, the UE may determine a candidate for blind decoding based on the second bandwidth value. In some cases, signaling the UE to override or modify its operating bandwidth may optimize forward compatibility with wireless communication systems based on new wireless standards, thus enabling a higher degree of flexibility. For example, new wireless communication systems or standards may be based on communication according to new bandwidth values, or based on new signals, which new signals are based on new bandwidth values.

Aspects of the disclosure are initially described in the context of a wireless communication system. Aspects of the disclosure are further illustrated by and described with reference to a message flow, apparatus diagrams, system diagrams, and flowcharts that relate to wireless devices using multiple bandwidths.

Figure 1:
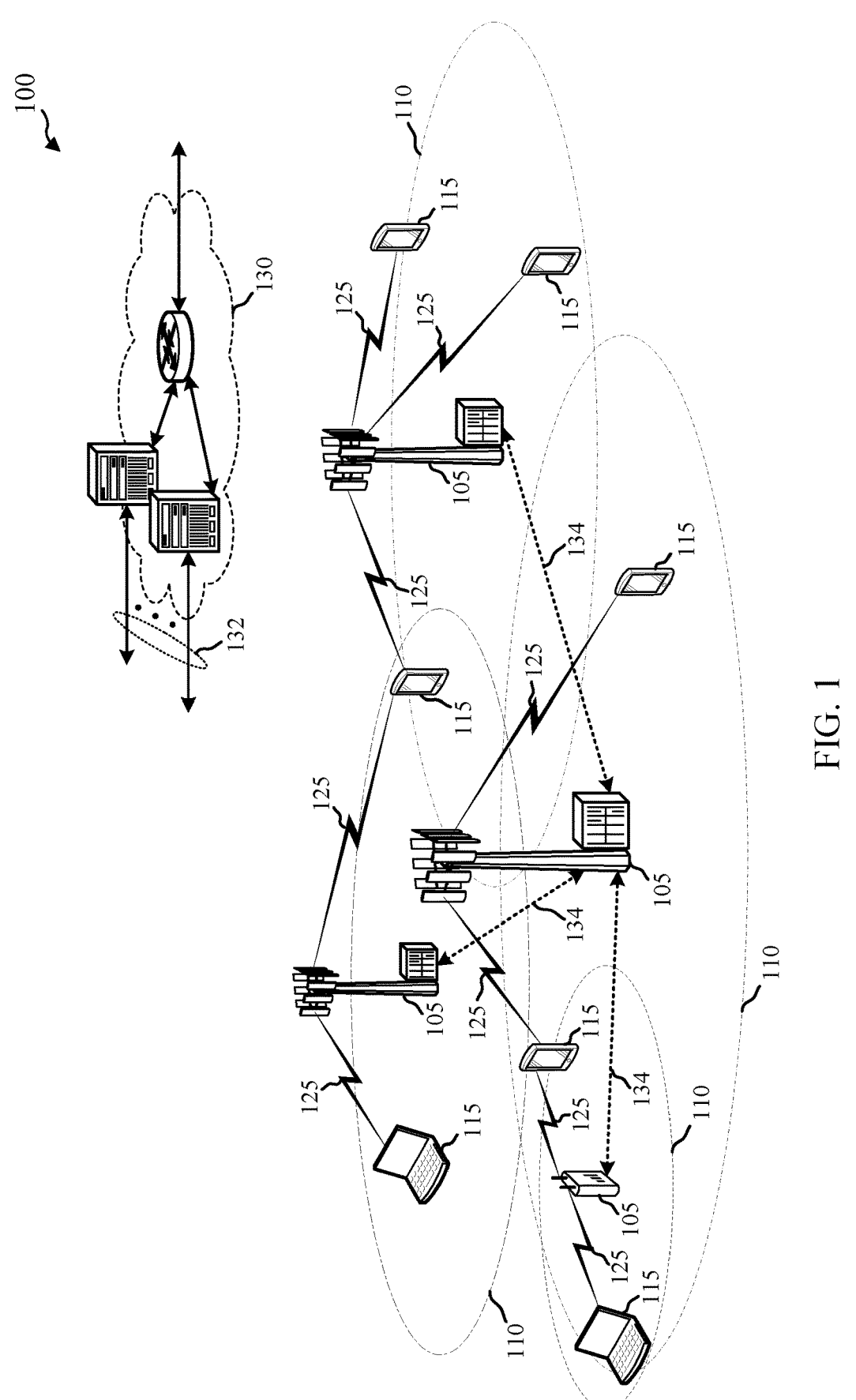
FIG. 1 illustrates an example of a wireless communication system, in accordance with various aspects of the present disclosure.

FIG. 1 illustrates an example of a wireless communication system 100, in accordance with various aspects of the present disclosure. The wireless communication system 100 includes base stations 105 (a type of network access device), UEs 115, and a core network (CN) 130. In some examples, the wireless communication system 100 may include a LTE/LTE-Advanced (LTE-A) network.

The base stations 105 may wirelessly communicate with the UEs 115 via one or more base station antennas. Each base station 105 may provide communication coverage for a respective geographic coverage area 110. Communication links 125 shown in wireless communication system 100 may include uplink (UL) transmissions from a UE 115 to a base station 105, or downlink (DL) transmissions, from a base station 105 to a UE 115. UEs 115 may be dispersed throughout the wireless communication system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine type communication (MTC) device, etc.

Base stations 105 may communicate with the CN 130 and with one another. For example, base stations 105 may interface with the CN 130 through backhaul links 132 (e.g., S1, etc.). Base stations 105 may communicate with one another over backhaul links 134 (e.g., X2, etc.) either directly or indirectly (e.g., through CN 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the CN 130. The CN 130 may be an evolved packet core (EPC), which may include one or more network nodes. In an example, CN 130 may include at least one mobility management entity (MME), at least one serving gateway (S-GW), and at least one packet data network (PDN) gateway (P-GW). The MME, S-GW, and P-GW may be implemented as single network nodes or may be separate network nodes. The MME may be the control node that processes the signaling between the UE 115 and the EPC. All user IP packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

In some cases, a base station 105 may broadcast a first bandwidth value that UEs 115 may use to receive transmissions from the base station 105. While using the first bandwidth value to receive transmissions, the UE 115 may receive a message (from a base station 105) including an indication of a second bandwidth value. The second bandwidth value may supplement or replace the first bandwidth value such that the UE 115 may receive downlink transmissions based on the second bandwidth value following receipt of the second bandwidth value.

FIG. 2 shows an example message flow 200 between a base station 105-a and a UE 115-a, in accordance with various aspects of the present disclosure. The base station 105-a and UE 115-a may be examples of aspects of the base stations 105 and UEs 115 described with reference to FIG. 1.

At 205, the base station 105-a may transmit a first message. The first message may include an indication of a first bandwidth value. In some examples, the first message may be broadcast in a PBCH.

At 210, the UE 115-a may receive the first message and identify the first bandwidth value. The UE 115-a may then use the first bandwidth value, at 215, to monitor for and receive downlink transmissions. In some examples, the downlink transmissions may include initial access related transmissions, such as transmissions related to time tracking, frequency tracking, signal measurement, system information decoding (e.g., system information block (SIB) decoding), or a combination thereof.

At 220, the base station 105-a may transmit a second message. The second message may be based on the first bandwidth value (e.g., transmitted within a bandwidth identified by the first bandwidth value, or demodulated based on reference signals of the first bandwidth value) and may include an indication of a second bandwidth value. The second bandwidth value may supplement the first bandwidth value. In some examples, the second message may include at least one of a system information message (e.g., a SIB or a master information block (MIB)), a broadcast message (e.g., a message transmitted in a PBCH), a unicast message (e.g., a radio resource control (RRC) message), or a resource grant (e.g., a resource grant included in DCI and/or carried over a downlink control channel). Transmitting the second message in a resource grant may enable more dynamic bandwidth changes. In some examples, the second bandwidth value may be associated with a device type, and when the UE 115-a determines the device type matches a device type of the UE 115-a, the UE 115-a may use the second bandwidth value to supplement the first bandwidth value. In some examples, the second bandwidth value may supplement the first bandwidth value for at least one of a transmission type, a channel, a symbol period, a slot, a subframe, a frame, or a combination thereof.

In some examples, the second bandwidth value may be associated with receipt of at least one RS, control channel, data channel, or combination thereof. For example, the second bandwidth value may be associated with receipt of a cell-specific reference signal (CRS), which CRS may be used for time tracking, frequency tracking, or demodulation of a control channel or a data channel. In some examples, the bandwidth used for transmission of a reference signal in a control channel may differ from the bandwidth used for transmission of a reference signal in a data channel. For example, in symbol periods in which a PDCCH is transmitted, the bandwidth used for reference signal transmission may be 20 MHz, and in symbol periods in which a PDSCH is transmitted, a CRS may only be transmitted on a center six physical resource blocks (PRBs) of a data region.

In some examples, the second message (transmitted at 220), or one or more additional messages (e.g., one or more messages transmitted at 225), may include one or more indications of additional bandwidth values (e.g., a third bandwidth value). For example, the base station 105-a may transmit an indication of a second bandwidth value associated with transmission of a control channel and an indication of a third bandwidth value associated with transmission of a data channel. In some examples, bandwidth values (or different bandwidth values) may be associated with at least one of one or more transmission types (or different transmission types), one or more channels (or different channels), one or more symbol periods (or different symbol periods), one or more slots (or different slots), one or more subframes (or different subframes), one or more frames (or different frames), or a combination thereof.

In some examples, the second message (transmitted at 220), or one or more additional messages (e.g., one or more messages transmitted at 225), may include one or more frequency offsets associated with one or more bandwidth values. For example, the base station 105-a may transmit an indication of a frequency offset associated with the second bandwidth value.

At 230, the UE 115-a may receive and decode, process, and/or apply the bandwidth values (and frequency offsets, if any) transmitted by the base station 105-a. For example, when the second bandwidth value is associated with receipt of a control channel, the UE 115-a may derive, based on the second bandwidth value, at least one of a third bandwidth value associated with receipt of a reference signal for demodulation of the control channel, a set of PDCCH resources to be monitored, or a combination thereof. In some examples, when the second bandwidth value is associated with receipt of a data channel, the UE 115-a may derive a third bandwidth value based on at least one of the second bandwidth value, a data channel grant, or a combination thereof. In some of these latter examples, the third bandwidth value may be associated with receipt of a reference signal for demodulation of the data channel. In some examples, when the second bandwidth value is associated with a frequency offset, the UE 115-*a* may determine, based on the frequency offset, a frequency position of the second bandwidth value. Applying a frequency offset to at least one bandwidth value may result in the UE 115-*a* monitoring for downlink transmissions in bandwidths having different center frequencies (e.g., the first bandwidth value may be 1.4 MHz, the second bandwidth value may be 5 MHz, and the second bandwidth value may be associated with a frequency offset such that the 1.4 MHz bandwidth is positioned at an edge of the 5 MHz bandwidth).

An indication of a bandwidth value transmitted by the base station 105-*a* may be explicit or implicit. In some examples, the operations at 230 may include implicitly deriving an indication of a bandwidth value from a message. For example, the UE 115-*a* may monitor for data in accordance with a resource grant based on one bandwidth value (e.g., 10 MHz), but upon receiving data within a smaller bandwidth (e.g., 1 MHz), the UE 115-*a* may derive a reference signal for the data using a bandwidth value of 1 MHz.

In some examples, different bandwidth values and/or frequency positions may be associated with a channel (e.g., a PDCCH or PDSCH) and the reference signal(s) (e.g., a CRS) for the channel. For example, a PDSCH may be associated with a bandwidth value of 6 PRBs, and a CRS associated with the PDSCH may be associated with a bandwidth value of 8 PRBs (e.g., to mitigate edge effects).

At 235, the base station 105-*a* may transmit on a downlink. The downlink transmissions may include, for example, reference signals, control channels, data channels, or combinations thereof. At 240, the UE 115-*a* may monitor for and receive the downlink transmissions based on one or more bandwidth values and/or frequency offsets. The UE 115-*a* may also monitor for and receive downlink transmissions from other devices based on one or more bandwidth values, and may measure the downlink transmissions received from the other devices for the purpose of interference cancellation, mobility, etc. When the second bandwidth value is associated with receipt of a control channel, in some examples, the UE 115-*a* may identify a candidate message for blind decoding based on the second bandwidth value. When the second bandwidth value is associated with receipt of a data channel, in some examples, the UE 115-*a* may interpret DCI based on the second bandwidth value.

In some examples, a UE 115 may not be able to operate over the entire system bandwidth of a base station 105. For example, a UE 115 may be an enhanced machine type communication (eMTC) device, a narrowband Internet of Things (NB-IoT) device, or a low cost device that operates similarly to an eMTC device or NB-IoT device. In these scenarios, the UE 115 may assume a bandwidth value (or values) for the receipt of control, data, and reference signal transmissions. The bandwidth value(s) may be a narrowband bandwidth value(s). When the UE 115 receives one or more wideband bandwidth values from the base station 105, the UE 115 may not supplement its assumed narrowband bandwidth value(s), but may modify one or more of its assumed narrowband bandwidth values based on the wideband bandwidth value(s). The UE 115 may also use the wideband bandwidth value(s) for other purposes. In some examples, the UE 115 may use one or more wideband bandwidth value to modify one or more of its assumed narrowband bandwidth values (e.g., for receipt of a reference signal, time tracking, frequency tracking, signal measurement, or a combination thereof). For example, the UE 115 may operate within a 6 PRB bandwidth, but may receive a CRS over 8 PRB based on an overlapping wideband bandwidth value, or a narrowband bandwidth value may be modified to be a fraction of a wideband bandwidth value.

Figure 3:
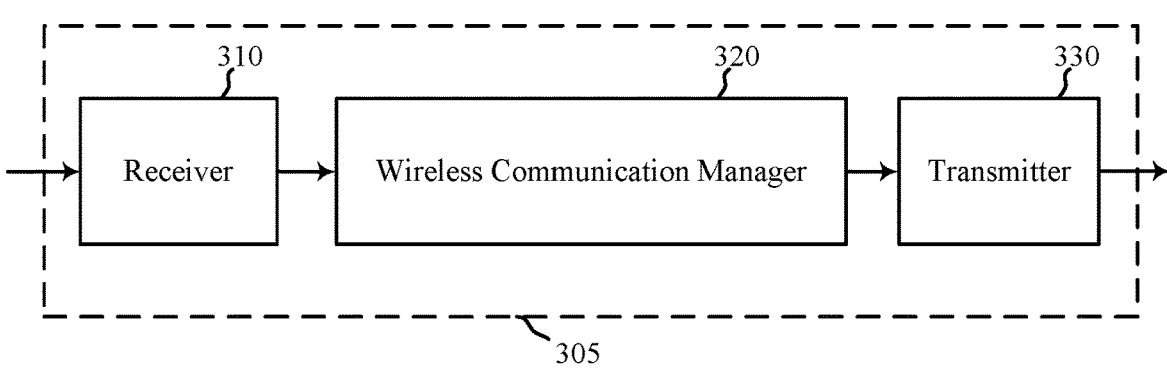
FIG. 3 shows a block diagram of a wireless device that supports operation in multiple bandwidths, in accordance with various aspects of the present disclosure.

FIG. 3 shows a block diagram 300 of a wireless device 305 that supports operation in multiple bandwidths, in accordance with various aspects of the present disclosure. The wireless device 305 may be an example of aspects of a UE 115 described with reference to FIGS. 1 and 2. The wireless device 305 may include a receiver 310, a wireless communication manager 320, and a transmitter 330. The wireless device 305 may also include a processor. Each of these components may be in communication with each other.

The receiver 310 may receive signals or information such as reference signals, control information, or user data associated with various channels (e.g., control channels, data channels, broadcast channels, multicast channels, unicast channels, etc.). Received signals and information may be used by the receiver 310 (e.g., for frequency/time tracking) or passed to other components of the wireless device 305, including the wireless communication manager 320. The receiver 310 may be an example of aspects of the transceiver 825 described with reference to FIG. 8. The receiver 310 may include or be associated with a single antenna or a plurality of antennas.

The wireless communication manager 320 may be used to manage one or more aspects of wireless communication for the wireless device 305. In some examples, part of the wireless communication manager 320 may be incorporated into or shared with the receiver 310 or the transmitter 330. In some examples, the wireless communication manager 320 may be an example of aspects of the wireless communication manager 805 described with reference to FIG. 8. The wireless communication manager 320 may be used to identify the bandwidths and/or frequency positions used by the wireless device 305 when receiving signals or information via the receiver 310.

The transmitter 330 may transmit signals or information received from other components of the wireless device 305, including the wireless communication manager 320. The signals or information may include, for example, reference signals, control information, or user data associated with various channels (e.g., control channels, data channels, broadcast channels, multicast channels, unicast channels, etc.). In some examples, the transmitter 330 may be collocated with the receiver 310 in a transceiver module. The transmitter 330 may be an example of aspects of the transceiver 825 described with reference to FIG. 8. The transmitter 330 may include or be associated with a single antenna or a plurality of antennas.

FIG. 4 shows a block diagram 400 of a wireless device 405 that supports operation in multiple bandwidths, in accordance with various aspects of the present disclosure. The wireless device 405 may be an example of aspects of a UE 115 or a wireless device 305 described with reference to FIGS. 1-3. The wireless device 405 may include a receiver 410, a wireless communication manager 420, and a transmitter 430. The wireless device 405 may also include a processor. Each of these components may be in communication with each other.

The receiver 410 may receive signals or information that may be used by the receiver 410 or passed to other components of the wireless device 405, including the wireless communication manager 420. The receiver 410 may also perform the functions described with reference to the receiver 310 of FIG. 3. The receiver 410 may be an example of aspects of the transceiver 825 described with reference to FIG. 8. The receiver 410 may include or be associated with a single antenna or a plurality of antennas.

The wireless communication manager 420 may be an example of aspects of the wireless communication manager 320 or 805 described with reference to FIG. 3 or 8. The wireless communication manager 420 may include a transmission reception manager 435 and a bandwidth manager 440.

The transmission reception manager 435 may be used to receive a broadcast of a first message. The first message may include an indication of a first bandwidth value, as described above with reference to FIG. 2. In some examples, the first message may be received in a PBCH.

The transmission reception manager 435 may also be used to receive, based on the first bandwidth value, a second message. In some examples, the second message may include at least one of a system information message, a broadcast message, a unicast message, or a resource grant. The second message may include an indication of a second bandwidth value, as described above with reference to FIG. 2. In some examples, the second bandwidth value may be associated with receipt of at least one RS, control channel, data channel, or combination thereof. In some examples, the second bandwidth value may be associated with a device type of the wireless device 405. The indication of the second bandwidth value may be explicitly included in the second message, or the transmission reception manager 435 may implicitly derive the second bandwidth value from the second message.

The bandwidth manager 440 may use the second bandwidth value to supplement the first bandwidth value, as described above with reference to FIG. 2. In some examples, the bandwidth manager 440 may replace the first bandwidth value with the second bandwidth value for at least one of a transmission type, a channel, a symbol period, a slot, a subframe, a frame, or a combination thereof.

The transmission reception manager 435 may be further used to receive downlink transmissions based on the second bandwidth value. The downlink transmissions based on the second bandwidth value may be received following receipt of the second message, as described above with reference to FIG. 2. In some examples, the wireless device 405 may also receive downlink transmissions based on the first bandwidth value or another bandwidth value.

The transmitter 430 may transmit signals or information received from other components of the wireless device 405, including the wireless communication manager 420. In some examples, the transmitter 430 may be collocated with the receiver 410 in a transceiver module. The transmitter 430 may be an example of aspects of the transceiver 825 described with reference to FIG. 8. The transmitter 430 may include or be associated with a single antenna or a plurality of antennas.

Figure 5:
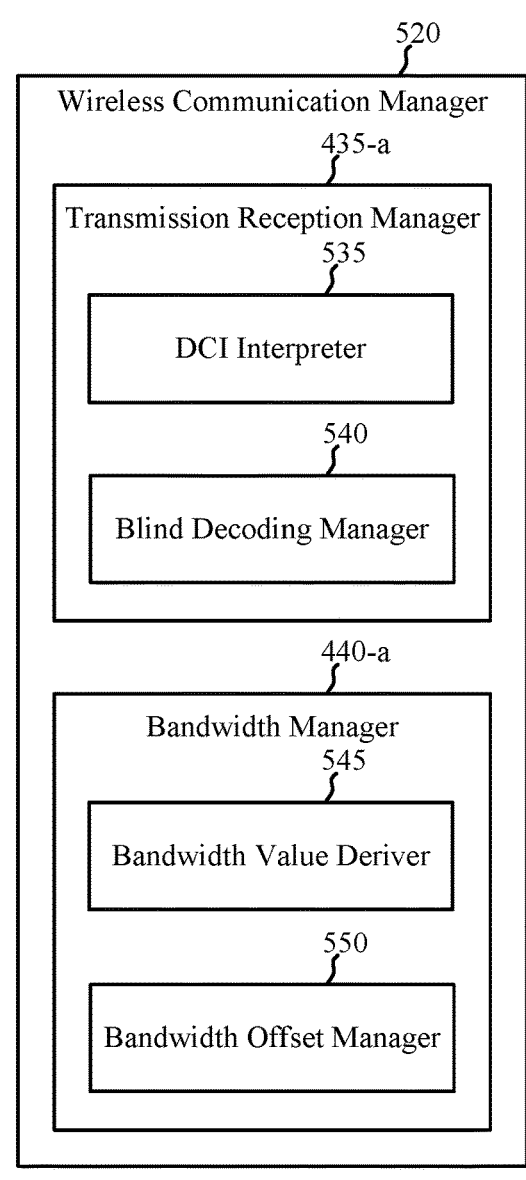
FIG. 5 shows a block diagram of a wireless communication manager, in accordance with various aspects of the present disclosure.

FIG. 5 shows a block diagram 500 of a wireless communication manager 520, in accordance with various aspects of the present disclosure. The wireless communication manager 520 may be an example of aspects of the wireless communication manager 320, 420, or 805 described with reference to FIG. 3, 4, or 8.

The wireless communication manager 520 may include a transmission reception manager 435-*a* and a bandwidth manager 440-*a*. The transmission reception manager 435-*a* may include DCI interpreter 535 or a blind decoding manager 540. The bandwidth manager 440-*a* may include a bandwidth value deriver 545 or a bandwidth offset manager 550. Each of these components may communicate, directly or indirectly, with one another (e.g., via one or more buses).

The transmission reception manager 435-*a* may be used to receive a broadcast of a first message. The first message may include an indication of a first bandwidth value, as described above with reference to FIG. 2. In some examples, the first message may be received in a PBCH.

The transmission reception manager 435-*a* may also be used to receive, based on the first bandwidth value, a second message. In some examples, the second message may include at least one of a system information message, a broadcast message, a unicast message, or a resource grant. The second message may include an indication of a second bandwidth value, as described above with reference to FIG. 2. In some examples, the second bandwidth value may be associated with receipt of at least one RS, control channel, data channel, or combination thereof. In some examples, the second bandwidth value may be associated with a device type of a wireless device including the wireless communication manager 520. The indication of the second bandwidth value may be explicitly included in the second message, or the transmission reception manager 435-*a* may implicitly derive the second bandwidth value from the second message.

In some examples, the transmission reception manager 435-*a* may be used to receive, based on the first bandwidth value or the second bandwidth value, an indication of a third bandwidth value. The second bandwidth value and the third bandwidth value may be associated with at least one of different transmission types, different channels, different symbol periods, different slots, different subframes, different frames, or a combination thereof, as described above with reference to FIG. 2. The indication of the third bandwidth value may be received in the second message or in a third message. If received in a third message, the third message may include, for example, a system information message, a broadcast message, a unicast message, or a resource grant. In some examples, the third bandwidth value may be associated with a device type of a wireless device including the wireless communication manager 520. The indication of the third bandwidth value may be explicitly included in the second or third message, or the transmission reception manager 435-*a* may implicitly derive the third bandwidth value from the second or third message.

In some examples, the transmission reception manager 435-*a* may be used to receive an indication of a frequency offset associated with the second bandwidth value, as described above with reference to FIG. 2. In some examples, the indication of the frequency offset may be received in the second message or in a third message. The bandwidth offset manager 550 may be used to determine, based at least in part on the frequency offset, a frequency position of the second bandwidth value, as described above with reference to FIG. 2. In some examples, the bandwidth offset manager 550 may also or alternatively be used to determine a frequency position of the third bandwidth value. The frequency position of the third bandwidth value may be determined based on the frequency offset associated with the second bandwidth value or another received offset.

The bandwidth manager 440-*a* may use the second bandwidth value or the third bandwidth value to supplement the first bandwidth value, as described above with reference to FIG. 2. In some examples, the bandwidth manager 440-*a* may replace the first bandwidth value with the second bandwidth value or the third bandwidth value for at least one of a transmission type, a channel, a symbol period, a slot, a subframe, a frame, or a combination thereof.

When the second bandwidth value is associated with receipt of a data channel, the bandwidth value deriver 545 may be used to derive a third bandwidth value based on the second bandwidth value, a data channel grant, or a combination thereof. The third bandwidth value may be associated with receipt of a RS for demodulation of the data channel, as described above with reference to FIG. 2.

When the second bandwidth value is associated with receipt of a control channel, the bandwidth value deriver 545 may be used to derive a third bandwidth value based on the second bandwidth value. The third bandwidth value may be associated with receipt of a RS for demodulation of the control channel, as described above with reference to FIG. 2. Additionally or alternatively, the transmission reception manager 435-a may be used to determine, based on the second bandwidth value, a set of PDCCH resources to be monitored.

The transmission reception manager 435-a may be further used to receive downlink transmissions based on the second bandwidth value and/or downlink transmissions based on the third bandwidth value. The downlink transmissions based on the second bandwidth value or the third bandwidth value may be received following receipt of the second message, as described above with reference to FIG. 2. In some examples, the wireless device may also receive downlink transmissions based on the first bandwidth value or another bandwidth value.

When the second bandwidth value is associated with receipt of a data channel, the downlink transmissions received using the transmission reception manager 435-a may include DCI. The DCI interpreter 535 may be used to interpret the received DCI based on the second bandwidth value, as described above with reference to FIG. 2.

When the second bandwidth value is associated with receipt of a control channel, the blind decoding manager 540 may be used to identify a candidate message for blind decoding based on the second bandwidth value, as described above with reference to FIG. 2.

In some examples, the downlink transmissions received by the transmission reception manager 435-a may include a channel and a reference signal for the channel. The channel and the reference signal may be received based on different bandwidth values, different frequency positions, or a combination thereof.

Figure 6:
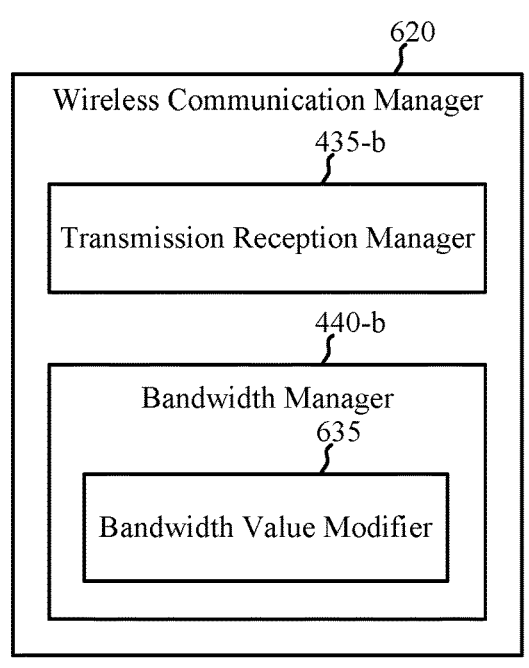
FIG. 6 shows a block diagram of a wireless communication manager, in accordance with various aspects of the present disclosure.

FIG. 6 shows a block diagram 600 of a wireless communication manager 620, in accordance with various aspects of the present disclosure. The wireless communication manager 620 may be an example of aspects of the wireless communication manager 320, 420, or 805 described with reference to FIG. 3, 4, or 8.

The wireless communication manager 620 may include a transmission reception manager 435-b and a bandwidth manager 440-b. The bandwidth manager 440-b may include a bandwidth value modifier 635. Each of these components may communicate, directly or indirectly, with one another (e.g., via one or more buses).

The bandwidth manager 440-b may be used to identify a narrowband bandwidth value, as described above with reference to FIG. 2.

The transmission reception manager 435-b may be used to receive, based on the narrowband bandwidth value, a message including an indication of a wideband bandwidth value, as described above with reference to FIG. 2. The wideband bandwidth value may be greater than the narrowband bandwidth value.

The bandwidth value modifier 635 may be used to modify the narrowband bandwidth value based on the wideband bandwidth value, as described above with reference to FIG. 2. The wideband bandwidth value may be greater than the narrowband bandwidth value. In some examples, modifying the narrowband bandwidth value may include increasing the narrowband bandwidth value for at least one of receipt of a RS, time tracking, frequency tracking, signal measurement, or a combination thereof.

The transmission reception manager 435-b may be further used to receive downlink transmissions based on the modified narrowband bandwidth value following receipt of the message, as described above with reference to FIG. 2.

FIG. 7 shows a block diagram 700 of a wireless device 705 that supports operation in multiple bandwidths, in accordance with various aspects of the present disclosure. The wireless device 705 may be an example of aspects of a base station 105 described with reference to FIGS. 1 and 2. The wireless device 705 may include a receiver 710, a wireless communication manager 720, and a transmitter 730. The wireless device 705 may also include a processor. Each of these components may be in communication with each other.

The receiver 710 may receive signals or information such as reference signals, control information, or user data associated with various channels (e.g., control channels, data channels, broadcast channels, multicast channels, unicast channels, etc.). Received signals and information may be used by the receiver 710 (e.g., for frequency/time tracking) or passed to other components of the wireless device 705, including the wireless communication manager 720. The receiver 710 may be an example of aspects of the transceiver 925 described with reference to FIG. 9. The receiver 710 may include or be associated with a single antenna or a plurality of antennas.

The wireless communication manager 720 may be an example of aspects of the wireless communication manager 320 or 905 described with reference to FIG. 3 or 9. The wireless communication manager 720 may include a bandwidth manager 735 and a transmission manager 740.

The bandwidth manager 735 may be used to determine bandwidth values and/or frequency offsets for downlink transmissions of the wireless device 705. In some examples, the bandwidth manager 735 may identify a first bandwidth value for downlink transmissions related to initial access, and one or more additional bandwidth values (including a second bandwidth value) for transmitting to UEs capable of receiving wider bandwidth transmissions. The one or more additional bandwidth values may supplement the first bandwidth value for certain device types, transmission types, channels, symbol periods, slots, subframes, frames, or combinations thereof.

The transmission manager 740 may be used to transmit (e.g., broadcast) a first message including the first bandwidth value, and transmit (e.g., broadcast, unicast, or multicast) a second message including the second bandwidth value or additional bandwidth values.

The transmitter 730 may transmit signals or information received from other components of the wireless device 705, including the wireless communication manager 720. The signals or information may include, for example, reference signals, control information, or user data associated with various channels (e.g., control channels, data channels, broadcast channels, multicast channels, unicast channels, etc.). In some examples, the transmitter 730 may be collocated with the receiver 710 in a transceiver module. The transmitter 730 may be an example of aspects of the transceiver 925 described with reference to FIG. 9. The transmitter 730 may include or be associated with a single antenna or a plurality of antennas.

Figure 8:
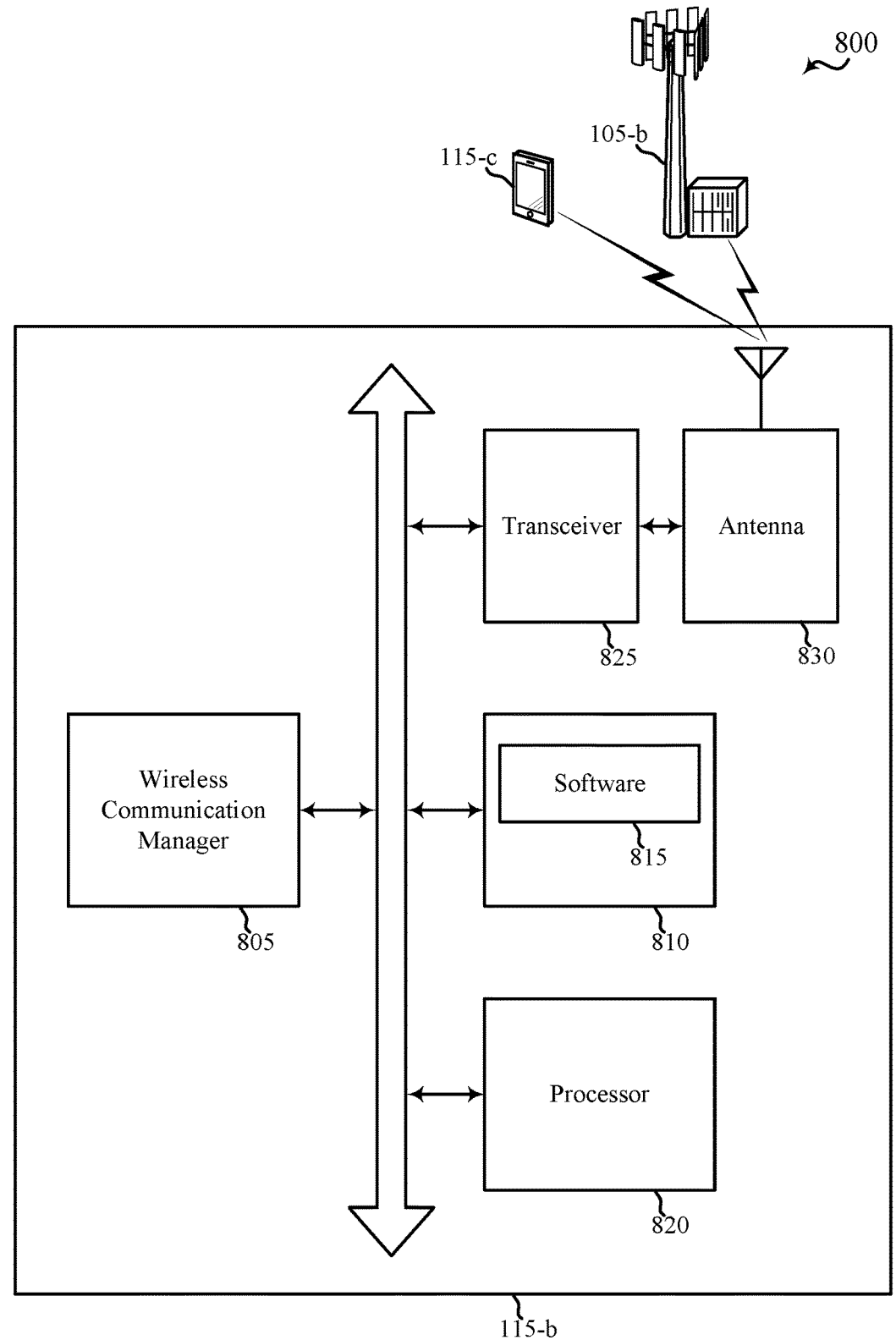
FIG. 8 shows a diagram of a wireless communication system including a wireless device that supports operation in multiple bandwidths, in accordance with various aspects of the present disclosure.

FIG. 8 shows a diagram of a wireless communication system 800 including a wireless device that supports operation in multiple bandwidths, in accordance with various aspects of the present disclosure. For example, the wireless communication system 800 may include a UE 115-*b*, which may be an example of a UE 115 or wireless device 305 or 405 described with reference to FIGS. 1-4.

The UE 115-*b* may include a wireless communication manager 805, memory 810, a processor 820, a transceiver 825, and an antenna 830. Each of these components may communicate, directly or indirectly, with one another (e.g., via one or more buses). The wireless communication manager 805 may be an example of the wireless communication manager 320, 420, 520, or 620 described with reference to FIGS. 3-6.

The memory 810 may include random access memory (RAM) or read only memory (ROM). The memory 810 may store computer-readable, computer-executable software 815 including instructions that, when executed, cause the processor 820 to perform various functions described herein (e.g., receiving or identifying a first bandwidth value; receiving, based on the first bandwidth value, a second bandwidth value that is used to supplement, modify, or replace the first bandwidth value; receiving downlink transmissions based on the second bandwidth value or modified first bandwidth value; etc.). In some cases, the software 815 may not be directly executable by the processor 820 but may cause the processor 820 (e.g., when compiled and executed) to perform functions described herein. The processor 820 may include an intelligent hardware device, (e.g., a central processing unit (CPU), a microcontroller, an application specific integrated circuit (ASIC), etc.).

The transceiver 825 may communicate bi-directionally, via one or more antennas or wired links, with one or more networks, as described herein. For example, the transceiver 825 may communicate bi-directionally with a base station 105-*b* or another UE 115-*c*. The transceiver 825 may also include a modem to modulate packets and provide the modulated packets to the antennas for transmission, and to demodulate packets received from the antennas. In some cases, the UE 115-*b* may include a single antenna 830. However, in some cases the UE 115-*b* may have more than one antenna 830, which may be capable of concurrently transmitting or receiving multiple wireless transmissions.

Figure 9:
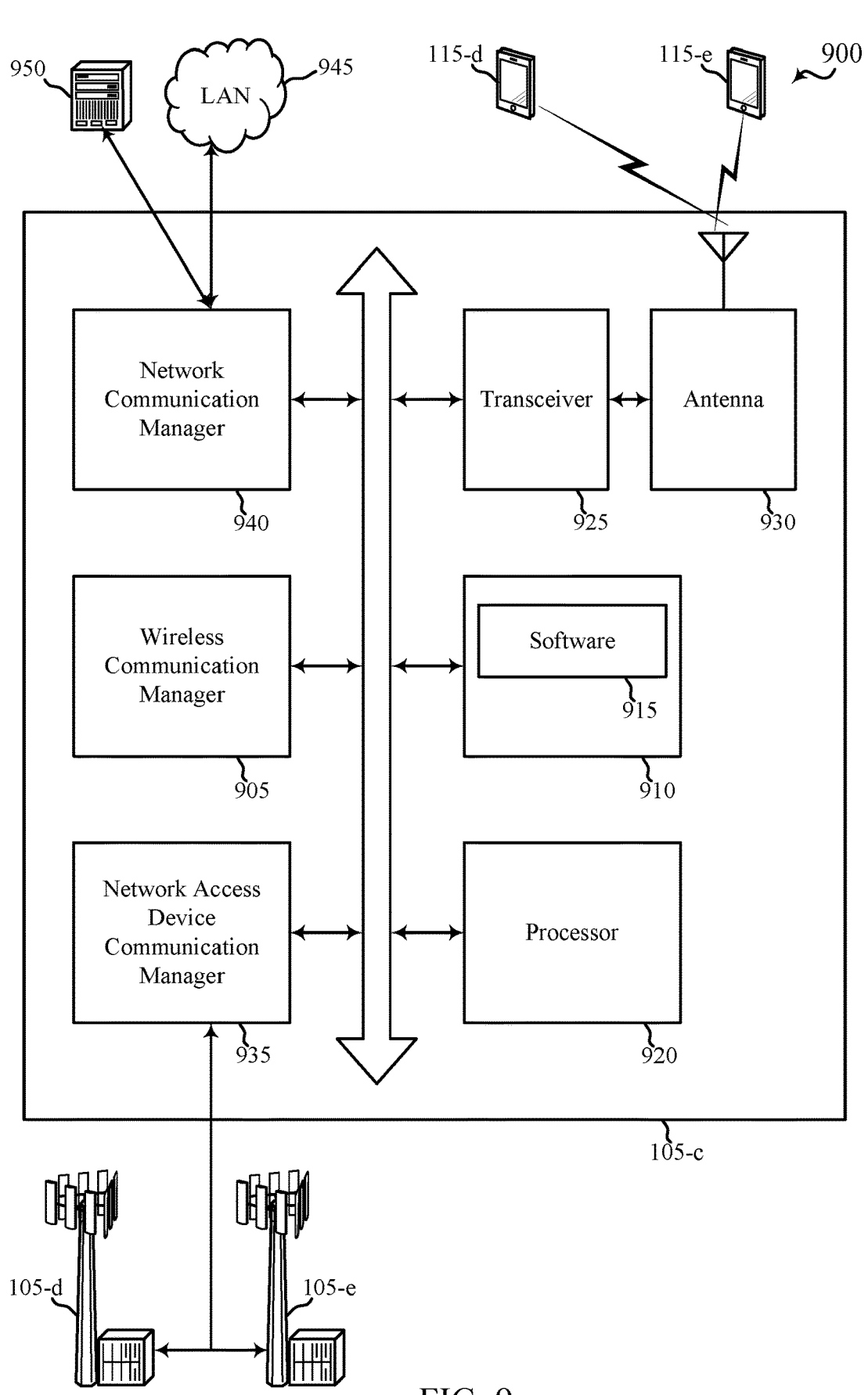
FIG. 9 shows a diagram of a wireless communication system including a wireless device that supports operation of UEs in multiple bandwidths, in accordance with various aspects of the present disclosure.

FIG. 9 shows a diagram of a wireless communication system 900 including a wireless device that supports operation of UEs in multiple bandwidths, in accordance with various aspects of the present disclosure. For example, the wireless communication system 900 may include a base station 105-*c*, which may be an example of a base station 105 or wireless device 705 described with reference to FIGS. 1, 2, and 7. The base station 105-*c* may include components for bi-directional voice and data communication, including components for transmitting communications and components for receiving communications. For example, the base station 105-*c* may communicate bi-directionally with one or more UEs 115. In some examples, the components of the base station 105-*c* may be incorporated into another form of network access device.

The base station 105-*c* may include a wireless communication manager 905, memory 910, a processor 920, a transceiver 925, an antenna 930, a network access device communication manager 935, and a network communication manager 940. Each of these components may communicate, directly or indirectly, with one another (e.g., via one or more buses). The wireless communication manager 905 may be an example of the wireless communication manager 720 described with reference to FIG. 7.

The memory 910 may include RAM or ROM. The memory 910 may store computer-readable, computer-executable software 915 including instructions that, when executed, cause the processor 920 to perform various functions described herein (e.g., transmitting a first bandwidth value; transmitting, based on the first bandwidth value, a second bandwidth value that may be used to supplement, replace, or modify the first bandwidth value; transmitting downlink transmissions based on the first bandwidth value and/or the second bandwidth value; etc.). In some cases, the software 915 may not be directly executable by the processor 920 but may cause the processor 920 (e.g., when compiled and executed) to perform functions described herein. The processor 920 may include an intelligent hardware device, (e.g., a CPU, a microcontroller, an ASIC, etc.).

The transceiver 925 may communicate bi-directionally, via one or more antennas or wired links, with one or more networks, as described herein. For example, the transceiver 925 may communicate bi-directionally with a UE 115-*d* or UE 115-*e*. The transceiver 925 may also include a modem to modulate packets and provide the modulated packets to the antennas for transmission, and to demodulate packets received from the antennas. In some cases, the base station 105-*c* may include a single antenna 930. However, in some cases the base station 105-*c* may have more than one antenna 930, which may be capable of concurrently transmitting or receiving multiple wireless transmissions.

The network access device communication manager 935 may manage communications with other network access devices (e.g., base station 105-*d* or 105-*e*), and may include a controller or scheduler for controlling communications with UEs 115 in cooperation with other base stations 105. In some examples, the network access device communication manager 935 may provide an X2 interface to provide communication between base stations 105.

The network communication manager 940 may manage communications with a LAN or CN (e.g., via one or more wired or wireless links). For example, the network communication manager 940 may manage the transfer of data between UEs 115 and a LAN 945 or CN 950.

FIG. 10 shows a flowchart illustrating a method 1000 for wireless communication in multiple bandwidths, in accordance with various aspects of the present disclosure. The operations of method 1000 may be performed by a wireless device, such as a UE 115 or its components, as described with reference to FIGS. 1-6 and 8. In some examples, the operations of method 1000 may be performed by the wireless communication manager described with reference to FIGS. 3-6 and 8. In some examples, a wireless device may execute a set of codes to control the functional elements of the wireless device to perform the functions described below. Additionally or alternatively, a wireless device may perform aspects of the functions described below using special-purpose hardware.

At block 1005, a wireless device may receive a broadcast of a first message. The first message may include an indication of a first bandwidth value, as described above with reference to FIGS. 2-5. In some examples, the first message may be received in a PBCH. In certain examples, the operations of block 1005 may be performed using the transmission reception manager 435 or bandwidth manager 440 described with reference to FIGS. 4 and 5.

At block 1010, the wireless device may receive, based on the first bandwidth value, a second message. The second message may include an indication of a second bandwidth value. The second bandwidth value may supplement or replace the first bandwidth value, as described above with reference to FIGS. 2-5. In some examples, the second message may include at least one of a system information message, a broadcast message, a unicast message, or a resource grant. In some examples, the second bandwidth value may replace the first bandwidth value for at least one of a transmission type, a channel, a symbol period, a slot, a subframe, a frame, or a combination thereof. In some examples, the second bandwidth value may be associated with receipt of at least one RS, control channel, data channel, or combination thereof. In some examples, the second bandwidth value may be associated with a device type of the wireless device. The indication of the second bandwidth value may be explicitly included in the second message, or may be implicitly derived from the second message. In certain examples, the operations of block 1010 may be performed using the transmission reception manager 435 or bandwidth manager 440 described with reference to FIGS. 4 and 5.

At block 1015, the wireless device may receive downlink transmissions based on the second bandwidth value. The downlink transmissions based on the second bandwidth value may be received following receipt of the second message, as described above with reference to FIGS. 2-5. In some examples, the wireless device may also receive downlink transmissions based on the first bandwidth value or another bandwidth value. In certain examples, the operations of block 1015 may be performed using the transmission reception manager 435 described with reference to FIGS. 4 and 5.

FIG. 11 shows a flowchart illustrating a method 1100 for wireless communication in multiple bandwidths, in accordance with various aspects of the present disclosure. The operations of method 1100 may be performed by a wireless device, such as a UE 115 or its components, as described with reference to FIGS. 1-6 and 8. In some examples, the operations of method 1100 may be performed by the wireless communication manager described with reference to FIGS. 3-6 and 8. In some examples, a wireless device may execute a set of codes to control the functional elements of the wireless device to perform the functions described below. Additionally or alternatively, a wireless device may perform aspects of the functions described below using special-purpose hardware.

At block 1105, a wireless device may receive a broadcast of a first message. The first message may include an indication of a first bandwidth value, as described above with reference to FIGS. 2-5. In some examples, the first message may be received in a PBCH. In certain examples, the operations of block 1105 may be performed using the transmission reception manager 435 or bandwidth manager 440 described with reference to FIGS. 4 and 5.

At block 1110, the wireless device may receive, based on the first bandwidth value, a second message. The second message may include an indication of a second bandwidth value. The second bandwidth value may supplement the first bandwidth value, as described above with reference to FIGS. 2-5. In some examples, the second message may include at least one of a system information message, a broadcast message, a unicast message, or a resource grant. In some examples, the second bandwidth value may replace the first bandwidth value for at least one of a transmission type, a channel, a symbol period, a slot, a subframe, a frame, or a combination thereof. In some examples, the second bandwidth value may be associated with receipt of at least one RS, control channel, data channel, or combination thereof.

In some examples, the second bandwidth value may be associated with a device type of the wireless device. The indication of the second bandwidth value may be explicitly included in the second message, or may be implicitly derived from the second message. In certain examples, the operations of block 1110 may be performed using the transmission reception manager 435 or bandwidth manager 440 described with reference to FIGS. 4 and 5.

At block 1115, the wireless device may receive, based on the first bandwidth value or the second bandwidth value, an indication of a third bandwidth value. The second bandwidth value and the third bandwidth value may be associated with at least one of different transmission types, different channels, different symbol periods, different slots, different subframes, different frames, or a combination thereof, as described above with reference to FIGS. 2 and 5. The indication of the third bandwidth value may be received in the second message (at block 1110) or in a third message. If received in a third message, the third message may include, for example, a system information message, a broadcast message, a unicast message, or a resource grant. In some examples, the third bandwidth value may be associated with a device type of the wireless device. The indication of the third bandwidth value may be explicitly included in the second or third message, or may be implicitly derived from the second or third message. In certain examples, the operations of block 1115 may be performed using the transmission reception manager 435 described with reference to FIGS. 4 and 5.

At block 1120, the wireless device may receive downlink transmissions based on the second bandwidth value and/or downlink transmissions based on the third bandwidth value. The downlink transmissions based on the second bandwidth value or the third bandwidth value may be received following receipt of the second message, as described above with reference to FIGS. 2 and 5. In some examples, the wireless device may also receive downlink transmissions based on the first bandwidth value or another bandwidth value. In certain examples, the operations of block 1120 may be performed using the transmission reception manager 435 described with reference to FIGS. 4 and 5.

Figure 12:
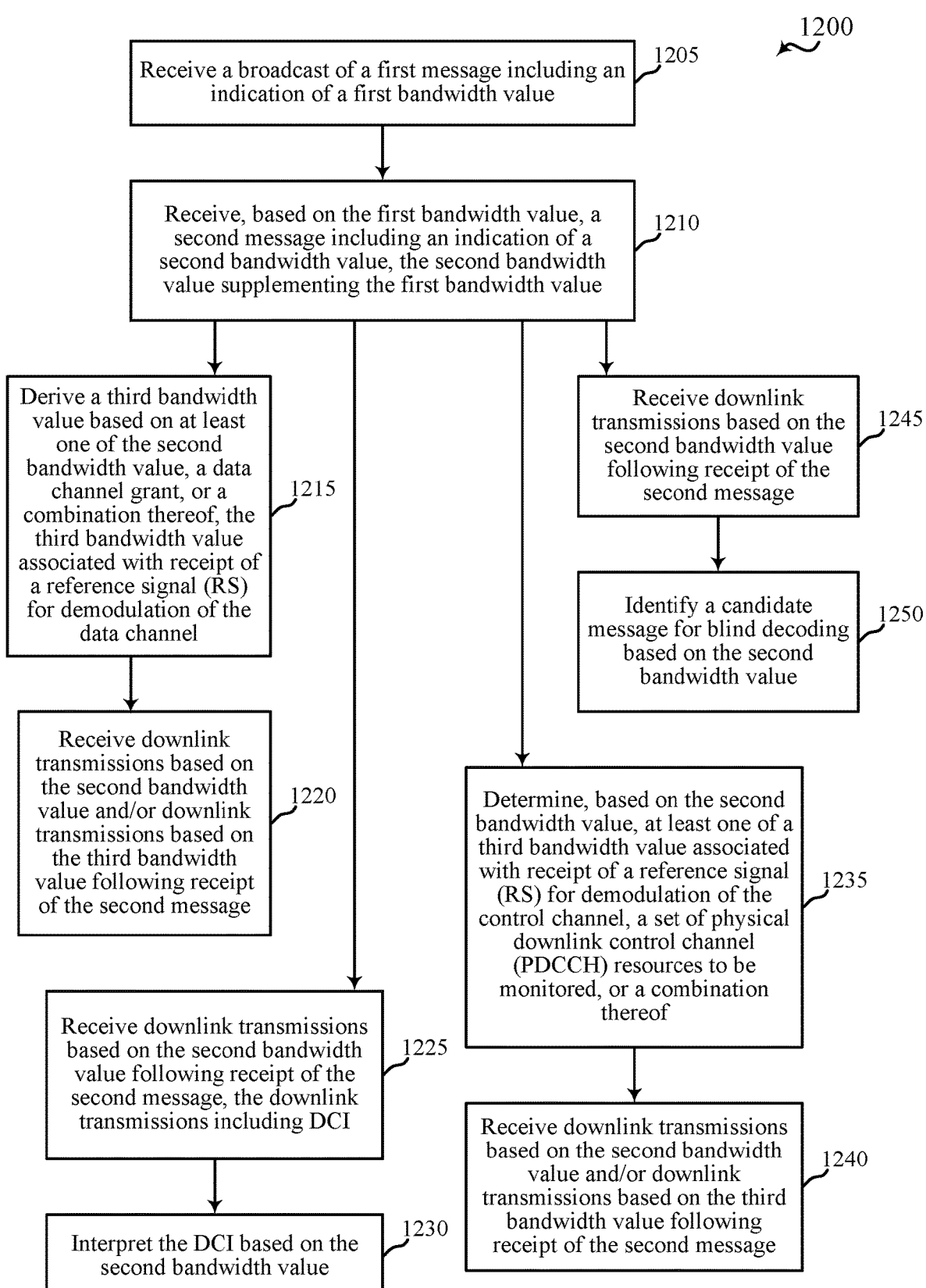
FIG. 12 shows a flowchart illustrating a method for wireless communication in multiple bandwidths, in accordance with various aspects of the present disclosure.

FIG. 12 shows a flowchart illustrating a method 1200 for wireless communication in multiple bandwidths, in accordance with various aspects of the present disclosure. The operations of method 1200 may be performed by a wireless device, such as a UE 115 or its components, as described with reference to FIGS. 1-6 and 8. In some examples, the operations of method 1200 may be performed by the wireless communication manager described with reference to FIGS. 3-6 and 8. In some examples, a wireless device may execute a set of codes to control the functional elements of the wireless device to perform the functions described below. Additionally or alternatively, a wireless device may perform aspects of the functions described below using special-purpose hardware.

At block 1205, a wireless device may receive a broadcast of a first message. The first message may include an indication of a first bandwidth value, as described above with reference to FIGS. 2-5. In some examples, the first message may be received in a PBCH. In certain examples, the operations of block 1205 may be performed using the transmission reception manager 435 or bandwidth manager 440 described with reference to FIGS. 4 and 5.

At block 1210, the wireless device may receive, based on the first bandwidth value, a second message. The second message may include an indication of a second bandwidth value. The second bandwidth value may supplement the first bandwidth value, as described above with reference to FIGS. 2-5. In some examples, the second message may include at least one of a system information message, a broadcast message, a unicast message, or a resource grant. In some examples, the second bandwidth value may replace the first bandwidth value for at least one of a transmission type, a channel, a symbol period, a slot, a subframe, a frame, or a combination thereof. In some examples, the second bandwidth value may be associated with receipt of at least one RS, control channel, data channel, or combination thereof. In some examples, the second bandwidth value may be associated with a device type of the wireless device. The indication of the second bandwidth value may be explicitly included in the second message, or may be implicitly derived from the second message. In certain examples, the operations of block 1210 may be performed using the transmission reception manager 435 or bandwidth manager 440 described with reference to FIGS. 4 and 5.

Following the operations of block 1210, method 1200 may continue at block 1215, 1225, 1235, or 1245. When the second bandwidth value is associated with receipt of a data channel, and at block 1215, the wireless device may derive a third bandwidth value based on the second bandwidth value, a data channel grant, or a combination thereof. The third bandwidth value may be associated with receipt of a RS for demodulation of the data channel, as described above with reference to FIGS. 2 and 5. In certain examples, the operations of block 1215 may be performed using the bandwidth manager 440 described with reference to FIGS. 4 and 5, or the bandwidth value deriver 545 described with reference to FIG. 5.

At block 1220, the wireless device may receive downlink transmissions based on the second bandwidth value and/or downlink transmissions based on the third bandwidth value. The downlink transmissions based on the second bandwidth value or the third bandwidth value may be received following receipt of the second message, as described above with reference to FIGS. 2 and 5. In some examples, the wireless device may also receive downlink transmissions based on the first bandwidth value or another bandwidth value. In certain examples, the operations of block 1220 may be performed using the transmission reception manager 435 described with reference to FIGS. 4 and 5.

When the second bandwidth value is associated with receipt of a data channel, and at block 1225, the wireless device may receive downlink transmissions based on the second bandwidth value. The downlink transmissions based on the second bandwidth value may be received following receipt of the second message. The downlink transmissions may include DCI, as described above with reference to FIGS. 2 and 5. In some examples, the wireless device may also receive downlink transmissions based on the first bandwidth value or another bandwidth value. In certain examples, the operations of block 1225 may be performed using the transmission reception manager 435 described with reference to FIGS. 4 and 5.

At block 1230, the wireless device may interpret the received DCI based on the second bandwidth value, as described above with reference to FIGS. 2 and 5. In certain examples, the operations of block 1230 may be performed using the transmission reception manager 435 described with reference to FIGS. 4 and 5 or the DCI interpreter 535 described with reference to FIG. 5.

When the second bandwidth value is associated with receipt of a control channel, and at block 1235, the wireless device may determine, based on the second bandwidth value, at least one of a third bandwidth value associated with receipt of a RS for demodulation of the control channel, a set of PDCCH resources to be monitored, or a combination thereof, as described above with reference to FIGS. 2 and 5. In certain examples, the operations of block 1235 may be performed using the transmission reception manager 435 or bandwidth manager 440 described with reference to FIGS. 4 and 5.

At block 1240, the wireless device may receive downlink transmissions based on the second bandwidth value and/or downlink transmissions based on the third bandwidth value. The downlink transmissions based on the second bandwidth value or the third bandwidth value may be received following receipt of the second message, as described above with reference to FIGS. 2 and 5. In some examples, the wireless device may also receive downlink transmissions based on the first bandwidth value or another bandwidth value. In certain examples, the operations of block 1240 may be performed using the transmission reception manager 435 described with reference to FIGS. 4 and 5.

When the second bandwidth value is associated with receipt of a control channel, and at block 1245, the wireless device may receive downlink transmissions based on the second bandwidth value. The downlink transmissions based on the second bandwidth value may be received following receipt of the second message, as described above with reference to FIGS. 2-5. In some examples, the wireless device may also receive downlink transmissions based on the first bandwidth value or another bandwidth value. In certain examples, the operations of block 1245 may be performed using the transmission reception manager 435 described with reference to FIGS. 4 and 5.

At block 1250, the wireless device may identify a candidate message for blind decoding based on the second bandwidth value, as described above with reference to FIGS. 2 and 5. In certain examples, the operations of block 1250 may be performed using the blind decoding manager 540 described with reference to FIG. 5.

FIG. 13 shows a flowchart illustrating a method 1300 for wireless communication in multiple bandwidths, in accordance with various aspects of the present disclosure. The operations of method 1300 may be performed by a wireless device, such as a UE 115 or its components, as described with reference to FIGS. 1-6 and 8. In some examples, the operations of method 1300 may be performed by the wireless communication manager described with reference to FIGS. 3-6 and 8. In some examples, a wireless device may execute a set of codes to control the functional elements of the wireless device to perform the functions described below. Additionally or alternatively, a wireless device may perform aspects of the functions described below using special-purpose hardware.

At block 1305, a wireless device may receive a broadcast of a first message. The first message may include an indication of a first bandwidth value, as described above with reference to FIGS. 2-5. In some examples, the first message may be received in a PBCH. In certain examples, the operations of block 1305 may be performed using the transmission reception manager 435 or bandwidth manager 440 described with reference to FIGS. 4 and 5.

At block 1310, the wireless device may receive, based on the first bandwidth value, a second message. The second message may include an indication of a second bandwidth value. The second bandwidth value may supplement the first bandwidth value, as described above with reference to FIGS. 2-5. In some examples, the second message may include at least one of a system information message, a broadcast message, a unicast message, or a resource grant. In some examples, the second bandwidth value may replace the first bandwidth value for at least one of a transmission type, a channel, a symbol period, a slot, a subframe, a frame, or a combination thereof. In some examples, the second bandwidth value may be associated with receipt of at least one RS, control channel, data channel, or combination thereof. In some examples, the second bandwidth value may be associated with a device type of the wireless device. The indication of the second bandwidth value may be explicitly included in the second message, or may be implicitly derived from the second message. In certain examples, the operations of block 1310 may be performed using the transmission reception manager 435 or bandwidth manager 440 described with reference to FIGS. 4 and 5.

At block 1315, the wireless device may receive an indication of a frequency offset associated with the second bandwidth value, as described above with reference to FIGS. 2 and 5. In some examples, the indication of the frequency offset may be received in the second message (at block 1310) or in a third message. In certain examples, the operations of block 1315 may be performed using the transmission reception manager 435 or bandwidth manager 440 described with reference to FIGS. 4 and 5, or the bandwidth offset manager 550 described with reference to FIG. 5.

At block 1320, the wireless device may determine, based on the frequency offset, a frequency position of the second bandwidth value, as described above with reference to FIGS. 2 and 5. In certain examples, the operations of block 1320 may be performed using the bandwidth offset manager 550 described with reference to FIG. 5.

At block 1325, the wireless device may receive downlink transmissions based on the second bandwidth value. The downlink transmissions based on the second bandwidth value may be received following receipt of the second message, as described above with reference to FIGS. 2-5. In some examples, the wireless device may also receive downlink transmissions based on the first bandwidth value or another bandwidth value. In certain examples, the operations of block 1325 may be performed using the transmission reception manager 435 described with reference to FIGS. 4 and 5.

FIG. 14 shows a flowchart illustrating a method 1400 for wireless communication in multiple bandwidths, in accordance with various aspects of the present disclosure. The operations of method 1400 may be performed by a wireless device, such as a UE 115 or its components, as described with reference to FIGS. 1-6 and 8. In some examples, the operations of method 1400 may be performed by the wireless communication manager described with reference to FIGS. 3-6 and 8. In some examples, a wireless device may execute a set of codes to control the functional elements of the wireless device to perform the functions described below. Additionally or alternatively, a wireless device may perform aspects of the functions described below using special-purpose hardware.

At block 1405, a wireless device may receive a broadcast of a first message. The first message may include an indication of a first bandwidth value, as described above with reference to FIGS. 2-5. In some examples, the first message may be received in a PBCH. In certain examples, the operations of block 1405 may be performed using the transmission reception manager 435 or bandwidth manager 440 described with reference to FIGS. 4 and 5.

At block 1410, the wireless device may receive, based on the first bandwidth value, a second message. The second message may include an indication of a second bandwidth value. The second bandwidth value may supplement the first bandwidth value, as described above with reference to FIGS. 2-5. In some examples, the second message may include at least one of a system information message, a broadcast message, a unicast message, or a resource grant. In some examples, the second bandwidth value may replace the first bandwidth value for at least one of a transmission type, a channel, a symbol period, a slot, a subframe, a frame, or a combination thereof. In some examples, the second bandwidth value may be associated with receipt of at least one RS, control channel, data channel, or combination thereof. In some examples, the second bandwidth value may be associated with a device type of the wireless device. The indication of the second bandwidth value may be explicitly included in the second message, or may be implicitly derived from the second message. In certain examples, the operations of block 1410 may be performed using the transmission reception manager 435 or bandwidth manager 440 described with reference to FIGS. 4 and 5.

At block 1415, the wireless device may receive downlink transmissions based on the second bandwidth value. The downlink transmissions based on the second bandwidth value may be received following receipt of the second message, as described above with reference to FIGS. 2-5. The wireless device may also receive downlink transmissions based on at least one of the first bandwidth value or another bandwidth value (e.g., a third bandwidth value). The received downlink transmissions may include a channel and a reference signal for the channel. The channel and the reference signal may be received based on different bandwidth values, different frequency positions, or a combination thereof. In certain examples, the operations of block 1415 may be performed using the transmission reception manager 435 described with reference to FIGS. 4 and 5.

FIG. 15 shows a flowchart illustrating a method 1500 for wireless communication in multiple bandwidths, in accordance with various aspects of the present disclosure. The operations of method 1500 may be performed by a wireless device, such as a UE 115 or its components, as described with reference to FIGS. 1-3, 6, and 8. In some examples, the operations of method 1500 may be performed by the wireless communication manager described with reference to FIGS. 3-6 and 8. In some examples, a wireless device may execute a set of codes to control the functional elements of the wireless device to perform the functions described below. Additionally or alternatively, a wireless device may perform aspects of the functions described below using special-purpose hardware.

At block 1505, a wireless device may identify a narrowband bandwidth value, as described above with reference to FIGS. 2 and 6. In certain examples, the operations of block 1505 may be performed using the bandwidth manager 440 described with reference to FIGS. 4 and 6.

At block 1510, the wireless device may receive, based on the narrowband bandwidth value, a message including an indication of a wideband bandwidth value, as described above with reference to FIGS. 2 and 6. The wideband bandwidth value may be greater than the narrowband bandwidth value. In certain examples, the operations of block 1510 may be performed using the transmission reception manager 435 or bandwidth manager 440 described with reference to FIGS. 4 and 6.

At block 1515, the wireless device may modify the narrowband bandwidth value based on the wideband bandwidth value, as described above with reference to FIGS. 2 and 6. The wideband bandwidth value may be greater than the narrowband bandwidth value. In some examples, modifying the narrowband bandwidth value may include increasing the narrowband bandwidth value for at least one of receipt of a RS, time tracking, frequency tracking, signal measurement, or a combination thereof. In certain examples, the operations of block 1515 may be performed using the bandwidth manager 440 described with reference to FIGS. 4 and 6 or the bandwidth value modifier 635 described with reference to FIG. 6.

At block 1520, the wireless device may receive downlink transmissions based on the modified narrowband bandwidth value following receipt of the message, as described above with reference to FIGS. 2 and 6. In certain examples, the operations of block 1520 may be performed using the transmission reception manager 435 described with reference to FIGS. 4 and 6.

It should be noted that the methods described above illustrate possible implementations of the techniques described in the present disclosure. In some examples, aspects of the methods 1000, 1100, 1200, 1300, 1400, and/or 1500 described with reference to FIGS. 10, 11, 12, 13, 14, and 15 may be combined. In some examples, the operations of the methods may be performed in different orders or include different operations. In some examples, aspects of one of the methods may include steps or aspects of one or more of the other methods, or other steps or techniques described herein.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different (physical) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communication systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunication system (Universal Mobile Telecommunication system (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communication system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communication system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communication system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communication system 100 of FIG. 1 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method for wireless communication at a wireless device, comprising:

receiving a broadcast of a first message comprising an indication of a first bandwidth value;

receiving, based on the first bandwidth value, a second message comprising a radio resource control (RRC) message, the second message comprising an indication of a second bandwidth value, wherein the second bandwidth value replaces the first bandwidth value;

receiving a second RRC message comprising an indication of a frequency offset associated with the second bandwidth value;

determining a frequency position that indicates a plurality of physical resource blocks for the second bandwidth value using the frequency offset;

receiving downlink transmissions comprising downlink control information (DCI) based on the second bandwidth value following receipt of the second message; and interpreting the DCI based on the second bandwidth value.

2. The method of claim 1, wherein the second bandwidth value is associated with a device type of the wireless device.

3. The method of claim 1, further comprising:

receiving, based on the first bandwidth value or the second bandwidth value, an indication of a third bandwidth value, wherein the second bandwidth value and the third bandwidth value are associated with at least one of: different transmission types, different channels, different symbol periods, different slots, different subframes, different frames, or a combination thereof; and
receiving downlink transmissions based on the third bandwidth value following receipt of the second message.

4. The method of claim 3, further comprising:
receiving the indication of the third bandwidth value in the second message or in a third message.

5. The method of claim 1, further comprising:
receiving the first message in a physical broadcast channel (PBCH).

6. The method of claim 1, wherein the second bandwidth value is associated with receipt of a cell-specific reference signal (CRS) for at least one of time tracking, frequency tracking, or demodulation of a control channel or a data channel.

7. The method of claim 1, wherein the second bandwidth value is associated with receipt of a data channel, the method further comprising:
deriving a third bandwidth value based on at least one of: the second bandwidth value, a data channel grant, or a combination thereof, the third bandwidth value associated with receipt of a reference signal (RS) for demodulation of the data channel.

8. The method of claim 1, wherein the second bandwidth value is associated with receipt of a control channel, the method further comprising:
determining, based on the second bandwidth value, at least one of: a third bandwidth value associated with receipt of a reference signal (RS) for demodulation of the control channel, a set of physical downlink control channel (PDCCH) resources to be monitored, or a combination thereof.

9. The method of claim 1, wherein the second bandwidth value is associated with receipt of a control channel, the method further comprising:
identifying a candidate message for blind decoding based on the second bandwidth value.

10. The method of claim 1, further comprising:
receiving downlink transmissions based on at least one of the first bandwidth value or a third bandwidth value following receipt of the second message,
wherein the received downlink transmissions comprise a channel, and a reference signal for the channel, received based on: different bandwidth values, different frequency positions, or a combination thereof.

11. The method of claim 1, further comprising:
implicitly deriving the indication of the second bandwidth value from the second message.

12. An apparatus for wireless communication at a wireless device, comprising:
means for receiving a broadcast of a first message comprising an indication of a first bandwidth value;
means for receiving, based on the first bandwidth value, a second message comprising a radio resource control (RRC) message, the second message comprising an indication of a second bandwidth value, wherein the second bandwidth value replaces the first bandwidth value;
means for receiving a second RRC message comprising an indication of a frequency offset associated with the second bandwidth value;
means for determining a frequency position that indicates a plurality of physical resource blocks for the second bandwidth value using the frequency offset;

means for receiving downlink transmissions comprising downlink control information (DCI) based on the second bandwidth value following receipt of the second message; and
means for interpreting the DCI based on the second bandwidth value.

13. The apparatus of claim 12, wherein the second bandwidth value is associated with a device type of the wireless device.

14. The apparatus of claim 12, further comprising:
means for receiving, based on the first bandwidth value or the second bandwidth value, an indication of a third bandwidth value, wherein the second bandwidth value and the third bandwidth value are associated with at least one of: different transmission types, different channels, different symbol periods, different slots, different subframes, different frames, or a combination thereof, and
means for receiving downlink transmissions based on the third bandwidth value following receipt of the second message.

15. The apparatus of claim 14, further comprising:
means for receiving the indication of the third bandwidth value in the second message or in a third message.

16. The apparatus of claim 12, further comprising:
means for receiving the first message in a physical broadcast channel (PBCH).

17. The apparatus of claim 12, wherein the second bandwidth value is associated with receipt of at least one reference signal (RS), control channel, data channel, or combination thereof.

18. The apparatus of claim 12, wherein the second bandwidth value is associated with receipt of a data channel, the apparatus further comprising:
means for deriving a third bandwidth value based on at least one of: the second bandwidth value, a data channel grant, or a combination thereof, the third bandwidth value associated with receipt of a reference signal (RS) for demodulation of the data channel.

19. The apparatus of claim 12, wherein the second bandwidth value is associated with receipt of a data channel, the apparatus further comprising:
means for receiving downlink control information (DCI) following receipt of the second message; and
means for interpreting the DCI based on the second bandwidth value.

20. The apparatus of claim 12, wherein the second bandwidth value is associated with receipt of a control channel, the apparatus further comprising:
means for determining, based on the second bandwidth value, at least one of: a third bandwidth value associated with receipt of a reference signal (RS) for demodulation of the control channel, a set of physical downlink control channel (PDCCH) resources to be monitored, or a combination thereof.

21. The apparatus of claim 12, wherein the second bandwidth value is associated with receipt of a control channel, the apparatus further comprising:
means for identifying a candidate message for blind decoding based on the second bandwidth value.

22. The apparatus of claim 12, further comprising:
means for receiving downlink transmissions based on at least one of the first bandwidth value or a third bandwidth value following receipt of the second message,
wherein the received downlink transmissions comprise a channel, and a reference signal for the channel, received based on: different bandwidth values, different frequency positions, or a combination thereof.

23. The apparatus of claim 12, further comprising:

means for implicitly deriving the indication of the second bandwidth value from the second message.

24. An apparatus for wireless communication at a wireless device, comprising:

a processor, memory in electronic communication with the processor; and instructions stored in the memory and operable, when executed by the processor, to cause the apparatus to:

receive a broadcast of a first message comprising an indication of a first bandwidth value;

receive, based on the first bandwidth value, a second message comprising a radio resource control (RRC) message, the second message comprising an indication of a second bandwidth value, wherein the second bandwidth value replaces the first bandwidth value;

receive a second RRC message comprising an indication of a frequency offset associated with the second bandwidth value;

determine a frequency position that indicates a plurality of physical resource blocks for the second bandwidth value using the frequency offset;

receive downlink transmissions comprising downlink control information (DCI) based on the second bandwidth value following receipt of the second message; and interpret the DCI based on the second bandwidth value.

25. The apparatus of claim 24, wherein the instructions are further executable by the processor to:

receive, based on the first bandwidth value or the second bandwidth value, an indication of a third bandwidth value, wherein the second bandwidth value and the third bandwidth value are associated with at least one of: different transmission types, different channels, different symbol periods, different slots, different sub-frames, different frames, or a combination thereof; and receive downlink transmissions based on the third bandwidth value following receipt of the second message.

26. The apparatus of claim 24, wherein the second bandwidth value is associated with receipt of at least one reference signal (RS), control channel, data channel, or combination thereof.

27. The apparatus of claim 24, wherein the instructions are further executable by the processor to:

receive downlink transmissions based on at least one of the first bandwidth value or a third bandwidth value following receipt of the second message, wherein the received downlink transmissions comprise a channel, and a reference signal for the channel, received based on: different bandwidth values, different frequency positions, or a combination thereof.

28. A non-transitory computer-readable medium storing computer-executable code for wireless communication at a wireless device, the code executable to:

receive a broadcast of a first message comprising an indication of a first bandwidth value;

receive, based on the first bandwidth value, a second message comprising a radio resource control (RRC) message, the second message comprising an indication of a second bandwidth value, wherein the second bandwidth value replaces the first bandwidth value;

receive a second RRC message comprising an indication of a frequency offset associated with the second bandwidth value;

determine a frequency position that indicates a plurality of physical resource blocks for the second bandwidth value using the frequency offset;

receive downlink transmissions comprising downlink control information (DCI) based on the second bandwidth value following receipt of the second message; and interpret the DCI based on the second bandwidth value.

29. A method for wireless communication at a wireless device, comprising:

identifying a narrowband bandwidth value;

receiving, based on the narrowband bandwidth value, a message comprising an indication of a wideband bandwidth value, wherein the wideband bandwidth value is greater than the narrowband bandwidth value;

increasing the narrowband bandwidth value from a first narrowband value to a second narrowband value that is a fraction of the indicated wideband bandwidth value, the second narrowband value being different than the indicated wideband bandwidth value, wherein increasing the narrowband bandwidth value to the second narrowband value is based at least in part on an overlap of the narrowband bandwidth value with the indicated wideband bandwidth value; and receiving downlink transmissions based on the second narrowband value following receipt of the message.

30. The method of claim 29, wherein increasing the narrowband bandwidth value further comprises:

increasing the narrowband bandwidth value for at least one of: receipt of a reference signal (RS), time tracking, frequency tracking, signal measurement, or a combination thereof.

31. An apparatus for wireless communication at a wireless device, comprising:

means for identifying a narrowband bandwidth value;

means for receiving, based on the narrowband bandwidth value, a message comprising an indication of a wideband bandwidth value, wherein the wideband bandwidth value is greater than the narrowband bandwidth value;

means for increasing the narrowband bandwidth value from a first narrowband value to a second narrowband value that is a fraction of the indicated wideband bandwidth value, the second narrowband value being different than the indicated wideband bandwidth value, wherein increasing the narrowband bandwidth value to the second narrowband value is based at least in part on an overlap of the narrowband bandwidth value with the indicated wideband bandwidth value; and means for receiving downlink transmissions based on the second narrowband value following receipt of the message.

32. The apparatus of claim 31, wherein the means for increasing the narrowband bandwidth value comprises:

means for increasing the narrowband bandwidth value for at least one of: receipt of a reference signal (RS), time tracking, frequency tracking, signal measurement, or a combination thereof.

33. An apparatus for wireless communication at a wireless device, comprising:

a processor;

memory in electronic communication with the processor; and instructions stored in the memory and operable, when executed by the processor, to cause the apparatus to:

identify a narrowband bandwidth value;

receive, based on the narrowband bandwidth value, a message comprising an indication of a wideband bandwidth value, wherein the wideband bandwidth value is greater than the narrowband bandwidth value;

increase the narrowband bandwidth value from a first narrowband value to a second narrowband value that is a fraction of the indicated wideband bandwidth value, the second narrowband value being different than the indicated wideband bandwidth value, wherein increasing the narrowband bandwidth value to the second narrowband value is based at least in part on an overlap of the narrowband bandwidth value with the indicated wideband bandwidth value; and receive downlink transmissions based on the second narrowband value following receipt of the message.

34. The apparatus of claim 33, wherein the instructions executable by the processor to increase the narrowband bandwidth value comprise instructions executable by the processor to:

increase the narrowband bandwidth value for at least one of: receipt of a reference signal (RS), time tracking, frequency tracking, signal measurement, or a combination thereof.

35. A non-transitory computer-readable medium storing computer-executable code for wireless communication at a wireless device, the code executable to:

identify a narrowband bandwidth value;

receive, based on the narrowband bandwidth value, a message comprising an indication of a wideband bandwidth value, wherein the wideband bandwidth value is greater than the narrowband bandwidth value;

increase the narrowband bandwidth value from a first narrowband value to a second narrowband value that is a fraction of the indicated wideband bandwidth value, the second narrowband value being different than the indicated wideband bandwidth value, wherein increasing the narrowband bandwidth value to the second narrowband value is based at least in part on an overlap of the narrowband bandwidth value with the indicated wideband bandwidth value; and receive downlink transmissions based on the second narrowband value following receipt of the message.

36. A method for wireless communication at a wireless device, comprising:

receiving a broadcast of a first message comprising an indication of a first narrowband bandwidth value;

receiving, based on the first narrowband bandwidth value, a second message comprising a radio resource control (RRC) message, the second message comprising an indication of a second narrowband bandwidth value, wherein the second narrowband bandwidth value replaces the first narrowband bandwidth value;

receiving a second RRC message comprising an indication of a frequency offset associated with the second narrowband bandwidth value, wherein the second narrowband bandwidth value and the first narrowband bandwidth value correspond to different center frequencies;

determining, based on the frequency offset, a frequency position that indicates a plurality of physical resource blocks for the second narrowband bandwidth value;

receiving downlink transmissions comprising downlink control information (DCI) based on the second narrowband bandwidth value following receipt of the second message; and interpreting the DCI based on the second narrowband bandwidth value.

37. An apparatus for wireless communication at a wireless device, comprising:

a processor;

memory in electronic communication with the processor; and instructions stored in the memory and operable, when executed by the processor, to cause the apparatus to:

receive a broadcast of a first message comprising an indication of a first narrowband bandwidth value;

receive, based on the first narrowband bandwidth value, a second message comprising a radio resource control (RRC) message, the second message comprising an indication of a second narrowband bandwidth value, wherein the second narrowband bandwidth value replaces the first narrowband bandwidth value;

receive a second RRC message comprising an indication of a frequency offset associated with the second narrowband bandwidth value, wherein the second narrowband bandwidth value and the first narrowband bandwidth value correspond to different center frequencies;

determine, based on the frequency offset, a frequency position that indicates a plurality of physical resource blocks for the second narrowband bandwidth value;

receive downlink transmissions comprising downlink control information (DCI) based on the second narrowband bandwidth value following receipt of the second message; and interpret the DCI based on the second narrowband bandwidth value.

* * * * *